US010826898B2

(12) United States Patent
Chandrasekaran et al.

(10) Patent No.: US 10,826,898 B2
(45) Date of Patent: Nov. 3, 2020

(54) FACIAL PROFILE PASSWORD TO MODIFY USER ACCOUNT DATA FOR HANDS FREE TRANSACTIONS

(71) Applicant: GOOGLE LLC, Mountain View, CA (US)

(72) Inventors: Sashikanth Chandrasekaran, Belmont, CA (US); Denise Ho, Los Altos, CA (US); Dmitry Kalenichenko, Marina del Rey, CA (US); Varouj Chitilian, Hillsborough, CA (US); Timothy Raymond Zwiebel, Mountain View, CA (US); Michal Palczewski, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/534,701

(22) Filed: Aug. 7, 2019

(65) Prior Publication Data
US 2019/0364039 A1 Nov. 28, 2019

Related U.S. Application Data

(63) Continuation of application No. 15/143,453, filed on Apr. 29, 2016, now Pat. No. 10,397,220.
(Continued)

(51) Int. Cl.
H04L 29/06 (2006.01)
G06F 21/32 (2013.01)
(Continued)

(52) U.S. Cl.
CPC .......... H04L 63/0861 (2013.01); G06F 21/32 (2013.01); G06Q 20/20 (2013.01);
(Continued)

(58) Field of Classification Search
CPC ...... G06Q 20/20; G06Q 20/40; G06Q 20/202; G06Q 20/206; G06Q 20/327;
(Continued)

(56) References Cited

U.S. PATENT DOCUMENTS 6,522,772 B1  2/2003 Morrison et al.
8,254,647 B1* 8/2012 Nechyba ............ G06K 9/00248
                                                382/118

(Continued)

FOREIGN PATENT DOCUMENTS

AU     2017101062 A4    8/2017
CN     104484669         4/2015
(Continued)

OTHER PUBLICATIONS

Berthon "International Search Report and Written Opinion issued in International Application No. PCT/US2016/029898", dated Jul. 22, 2016, 12 pages.
(Continued)

Primary Examiner — Lynn D Feild
Assistant Examiner — Richard A McCoy
(74) Attorney, Agent, or Firm — Dority & Manning, P.A.

(57) ABSTRACT

An account management system establishes an account for a user. The user enters user account information into the account and the account management system establishes a facial template for the user based on an image of the face of the user. The user requests to change user account information at a merchant POS (POS) device. The merchant POS device captures a facial image of the user and transmits the image the account management system, which generates a facial template and compares the generated facial template against the existing facial template associated with user account. If the generated facial template is less than a threshold difference from the existing facial template, the
(Continued)

user may update user account information at the merchant POS device, which communicates the updated user account information to the account management system. The account management system associates the updated user account information with the user account.

20 Claims, 16 Drawing Sheets

Related U.S. Application Data

(60) Provisional application No. 62/155,466, filed on Apr. 30, 2015, provisional application No. 62/302,142, filed on Mar. 1, 2016.

(51) Int. Cl.
*G06Q 20/20* (2012.01)
*G06Q 40/02* (2012.01)
*H04W 12/06* (2009.01)
*G06Q 20/32* (2012.01)
*G06Q 20/40* (2012.01)

(52) U.S. Cl.
CPC ....... *G06Q 20/204* (2013.01); *G06Q 20/3278* (2013.01); *G06Q 20/40145* (2013.01); *G06Q 40/02* (2013.01); *H04W 12/06* (2013.01)

(58) Field of Classification Search
CPC ............. G06Q 20/409; G06Q 20/3224; G06Q 20/4093; H04W 4/02; H04W 4/21; H04W 4/25; G06F 21/32; G06F 21/34; G06F 21/35; G06K 9/00275; G06K 9/281; G06K 9/328; G06K 9/00288; G06K 9/00228; G06K 9/00221; G06K 2009/00328

See application file for complete search history.

(56) References Cited

U.S. PATENT DOCUMENTS

| | | | |
|---|---|---|---|
| 8,577,810 B1 | 11/2013 | Dalit et al. | |
| 9,202,245 B2 | 12/2015 | Kostka et al. | |
| 9,229,623 B1* | 1/2016 | Penilla | H01M 10/46 |
| 9,619,803 B2 | 4/2017 | Chandrasekaran et al. | |
| 9,747,587 B2* | 8/2017 | Diehl | G06Q 20/20 |
| 9,770,206 B2* | 9/2017 | Ashokan | A61B 5/4872 |
| 9,881,303 B2* | 1/2018 | Vohra | G06Q 20/40145 |
| 9,972,004 B1* | 5/2018 | Donavalli | G06Q 20/3224 |
| 9,998,863 B2 | 6/2018 | Mycek et al. | |
| 2003/0046237 A1 | 3/2003 | Uberti | |
| 2005/0055582 A1 | 3/2005 | Bazakos et al. | |
| 2005/0165667 A1* | 7/2005 | Cox | G06Q 20/10 705/35 |
| 2006/0160525 A1 | 7/2006 | Watanabe | |
| 2009/0005987 A1* | 1/2009 | Vengroff | G06Q 30/02 701/300 |
| 2009/0119170 A1* | 5/2009 | Hammad | G06Q 20/10 705/14.17 |
| 2009/0313129 A1* | 12/2009 | Rothschild | G06Q 20/40145 705/17 |
| 2009/0325606 A1* | 12/2009 | Farris | H04W 4/023 455/456.3 |
| 2010/0006641 A1* | 1/2010 | Boutcher | G06Q 20/20 235/379 |
| 2010/0211966 A1* | 8/2010 | Zhang | H04N 21/4223 725/10 |
| 2011/0170739 A1 | 7/2011 | Gillam et al. | |
| 2011/0178883 A1 | 7/2011 | Granbery et al. | |
| 2011/0190055 A1* | 8/2011 | Leyvand | A63F 13/428 463/36 |
| 2011/0202466 A1* | 8/2011 | Carter | H04L 63/08 705/67 |
| 2011/0238510 A1 | 9/2011 | Rowen et al. | |
| 2011/0257985 A1* | 10/2011 | Goldstein | G06F 16/5838 705/1.1 |
| 2011/0307403 A1* | 12/2011 | Rostampour | G06Q 50/265 705/325 |
| 2012/0310736 A1 | 12/2012 | Vengroff et al. | |
| 2013/0035979 A1* | 2/2013 | Tenbrock | G06Q 30/02 705/7.29 |
| 2013/0159119 A1 | 6/2013 | Henderson et al. | |
| 2013/0223696 A1 | 8/2013 | Azar et al. | |
| 2013/0251216 A1 | 9/2013 | Smowton et al. | |
| 2014/0067649 A1* | 3/2014 | Kannan | G06Q 30/0261 705/38 |
| 2014/0165187 A1* | 6/2014 | Daesung | H04L 63/0861 726/19 |
| 2014/0222596 A1 | 8/2014 | S | |
| 2014/0289833 A1 | 9/2014 | Briceno et al. | |
| 2014/0289834 A1 | 9/2014 | Lindemann | |
| 2014/0372128 A1* | 12/2014 | Sheets | G06Q 20/20 704/273 |
| 2015/0046990 A1* | 2/2015 | Oberheide | G06F 21/45 726/6 |
| 2015/0066671 A1* | 3/2015 | Nichols | G07G 3/00 705/18 |
| 2015/0072618 A1 | 3/2015 | Granbery | |
| 2015/0073907 A1 | 3/2015 | Purves et al. | |
| 2015/0073980 A1* | 3/2015 | Griffin | H04W 8/005 705/39 |
| 2015/0079942 A1 | 3/2015 | Kostka et al. | |
| 2015/0120473 A1* | 4/2015 | Jung | G06Q 20/204 705/17 |
| 2015/0161417 A1* | 6/2015 | Kaplan | G06Q 30/0234 235/380 |
| 2015/0261787 A1* | 9/2015 | Hu | G06F 16/583 382/118 |
| 2015/0309569 A1* | 10/2015 | Kohlhoff | G06F 3/04842 345/156 |
| 2015/0332258 A1 | 11/2015 | Kurabi et al. | |
| 2015/0356563 A1* | 12/2015 | Vohra | G06Q 20/3224 705/44 |
| 2016/0014406 A1 | 1/2016 | Takahashi et al. | |
| 2016/0027073 A1 | 1/2016 | Eramian | |
| 2016/0042346 A1* | 2/2016 | Pastore | G06Q 20/363 705/44 |
| 2016/0063496 A1 | 3/2016 | Royyuru et al. | |
| 2016/0072915 A1 | 3/2016 | Decanne | |
| 2016/0180150 A1 | 6/2016 | Negi et al. | |
| 2016/0253656 A1 | 9/2016 | Dragushan et al. | |
| 2016/0321633 A1 | 11/2016 | Chandrasekaran et al. | |
| 2016/0321671 A1 | 11/2016 | Chandrasekaran et al. | |
| 2016/0323274 A1 | 11/2016 | Chandrasekaran et al. | |
| 2017/0004507 A1 | 1/2017 | Henderson et al. | |
| 2017/0164159 A1 | 6/2017 | Mycek et al. | |
| 2017/0193480 A1 | 7/2017 | Chandrasekaran et al. | |
| 2018/0114219 A1 | 4/2018 | Setchell et al. | |
| 2018/0255433 A1 | 9/2018 | Mycek et al. | |
| 2018/0349939 A1 | 12/2018 | Setchell et al. | |

FOREIGN PATENT DOCUMENTS

| | | |
|---|---|---|
| EP | 2 963 615 A1 | 1/2016 |
| GB | 2368951 A | 5/2002 |
| GB | 2513173 A | 10/2014 |
| WO | 2016/176517 A1 | 11/2016 |
| WO | 2016/176517 A8 | 11/2016 |
| WO | 2017/004602 A1 | 1/2017 |
| WO | 2018/075227 A1 | 4/2018 |
| WO | 2018/222232 A1 | 12/2018 |

OTHER PUBLICATIONS

Berthon "International Search Report and Written Opinion issued in International Application No. PCT/US2018/018443", dated Apr. 20, 2018, 14 pages.

(56) References Cited

OTHER PUBLICATIONS

Choi "U.S. Office Action issued in copending U.S. Appl. No. 15/299,444, filed Oct. 20, 2016", dated Mar. 5, 2019, 14 pages.
Choi "U.S. Office Action issued in copending U.S. Appl. No. 15/299,444, filed Oct. 20, 2016", dated Aug. 5, 2019, 18 pages.
Crawley "U.S. Office Action issued in copending U.S. Appl. No. 14/791,239, filed Jul. 2, 2015", dated Sep. 18, 2018, 25 pages.
Crawley "U.S. Office Action issued in copending U.S. Appl. No. 14/791,239, filed Jul. 2, 2015", dated May 16, 2018, 29 pages.
Crawley "U.S. Office Action issued in copending U.S. Appl. No. 14/791,239, filed Jul. 2, 2015", dated Oct. 5, 2016, 18 pages.
Crawley "U.S. Office Action issued in copending U.S. Appl. No. 14/791,239, filed Jul. 2, 2015", dated May 24, 2017, 29 pages.
Crawley "U.S. Office Action issued in copending U.S. Appl. No. 14/791,239, filed Jul. 2, 2015", dated Oct. 13, 2017, 30 pages.
Crawley "U.S. Office Action issued in co-pending U.S. Appl. No. 14/791,239, filed Jul. 2, 2015", dated Jun. 11, 2019, 22 pages.
Danzig "U.S. Office Action issued in copending U.S. Appl. No. 15/143,451, filed Apr. 29, 2016", dated Apr. 1, 2019, 15 pages.
"German Office Action issued in German Application No. 11-2016-001971.8", dated Mar. 27, 2019, 4 pages of English Office Action and 7 pages of German Office Action.
Keogh-Lehmann "International Search Report and Written Opinion issued in International Application No. PCT/US2016/040881", dated Aug. 26, 2016, 14 pages.
Lander "United Kingdom Office Action received for United Kingdom Patent Application No. 1715687.8", dated Oct. 31, 2017, 7 pages.
Lander "United Kingdom Office Action received for United Kingdom Patent Application No. 1715687.8", dated May 25, 2018, 8 pages.
Lander "United Kingdom Office Action received for United Kingdom Patent Application No. 1715687.8", dated Jan. 16, 2018, 5 pages.
Lander "United Kingdom Office Action received for United Kingdom Patent Application No. 1715687.8", dated Aug. 17, 2018, 6 pages.
Lander "United Kingdom Office Action received for United Kingdom Patent Application No. 1715687.8", dated Jan. 10, 2019, 14 pages.
Masud "U.S. Office Action issued in copending U.S. Appl. No. 15/462,772, filed Mar. 17, 2017", dated Apr. 16, 2019, 10 pages.
McCoy, Richard Anthony, "U.S. Office Action issued in copending U.S. Appl. No. 15/143,453, filed Apr. 29, 2016", dated Oct. 29, 2018, 18 pages.
McCoy "U.S. Office Action issued in copending U.S. Appl. No. 15/143,453, filed Apr. 29, 2016", dated Jun. 29, 2018, 16 pages.
McCoy "U.S. Office Action issued in copending U.S. Appl. No. 15/143,453, filed Apr. 29, 2016", dated Nov. 27, 2017, 11 pages.
Moon "International Preliminary Report on Patentability issued in International Application No. PCT/US2016/029898", dated Nov. 9, 2017, 9 pages.
Nickitas-Etienne "International Preliminary Report on Patentability issued in International Application No. PCT/US2016/040881", dated Jan. 11, 2018, 10 pages.
Thielemann "European Office Action issued in European Application No. 16738639.0", dated Aug. 9, 2019, 4 pages.
Ullah Masud "U.S. Office Action issued in copending U.S. Appl. No. 14/701,517, filed Apr. 30, 2015", dated Jun. 15, 2016, 11 pages.
Van Der Weiden "International Search Report and Written Opinion issued in International Application No. PCT/US2017/054621", dated Nov. 29, 2017, 13 pages.
Wittmann-Regis "International Preliminary Report on Patentability issued in International Application No. PCT/US2017/054621", dated May 2, 2019, 7 pages.
Crawley "U.S. Office Action issued in copending U.S. Appl. No. 14/791,239, filed Jul. 2, 2015", dated Oct. 3, 2019, 21 pages.
Danzig "U.S. Office Action issued in copending U.S. Appl. No. 15/143,451, filed Apr. 29, 2016", dated Oct. 16, 2019, 22 pages.
Lander "United Kingdom Office Action received for United Kingdom Patent Application No. 1715687.8", dated Oct. 21, 2019, 2 pages.
U.S. Appl. No. 14/701,517 to Sashikanth Chandrasekaran et al. filed Apr. 30, 2015.
U.S. Appl. No. 15/462,772 to Sashikanth Chandrasekaran et al. filed Mar. 17, 2017.
U.S. Appl. No. 14/791,239 to Philip Thomas Henderson et al. filed Jul. 2, 2015.
U.S. Appl. No. 15/143,451 to Sashikanth Chandrasekaran et al. filed Apr. 29, 2016.
U.S. Appl. No. 15/143,453 to Sashikanth Chandrasekaran et al. filed Apr. 29, 2016.
U.S. Appl. No. 15/299,444 to William Setchell et al. filed Oct. 20, 2016.
U.S. Appl. No. 15/915,050 to William Setchell et al. filed Mar. 7, 2018.
Sinsky "Square Introduces Hands-free Payments", CNET, Nov. 2, 2011, 4 pages.

* cited by examiner

FACIAL PROFILE PASSWORD TO MODIFY USER ACCOUNT DATA FOR HANDS FREE TRANSACTIONS

CROSS REFERENCE TO RELATED APPLICATIONS

This application claims priority to and is a continuation of U.S. patent application Ser. No. 15/143,453, filed Apr. 29, 2016, and entitled "Facial Profile Password to Modify User Account Data for Hands-Free Transactions," which claims priority to U.S. Patent Application No. 62/155,466, filed Apr. 30, 2015, and entitled "Identifying Consumers via Facial Recognition to Provide Services," and claims priority to U.S. Patent Application No. 62/302,142, filed Mar. 1, 2016, and entitled "Facial Profile Modification for Hands Free Transactions." The complete disclosure of the above-identified priority applications is hereby fully incorporated herein by reference.

TECHNICAL FIELD

The present disclosure relates to improving user security for updates to user account information by requiring updated user biometric information associated with user payment accounts to substantially agree with previously submitted biometric information.

BACKGROUND

When consumers make purchases at a merchant location, many methods of conducting a transaction are available. Consumers may use many different cards or accounts for purchases, such as gift cards, debit cards, credit cards, stored value cards, and other cards or accounts. The user account identifiers and other data represented by the cards may be communicated to the merchant system via magnetic stripes, near field communication technologies involving user computing devices, and other suitable mechanisms.

Current applications for conducting transactions at a merchant location may provide the opportunity for the consumer to make a hands-free transaction verified via biometric information of a user, such as image or voice recognition of a user at checkout. However, current applications may not adequately prevent illegitimate users from updating biometric information of a user.

SUMMARY

Techniques herein provide computer-implemented methods to process hands-free transactions with facial recognition of a user and for enabling the user to update account information for use in hands-free transactions via a password that comprises a facial template generated from an image of the user that was captured at the time the user desires to update the account information. In an example embodiment, a merchant system registers with an account management system. The merchant system installs one or more merchant beacon devices and one or more merchant POS devices at a merchant location. A user establishes an account with the account management system and downloads an application on a user computing device associated with the user. In an example, the user transmits an image of himself and/or an audio recording of himself to the account management system to establish a facial template and/or audio template associated with the user account. The user may also configure, via the user computing device, a challenge and response to associate with the user account, and the account management system receives the configuration of the challenge and response via the user computing device. For example, the challenge and response may comprise a question and answer. In this example, the question may read "What is your mother's maiden name?" and the answer may read "Smith." In another example, the challenge and response may comprise a request for a password and a password.

After initially configuring the facial template audio template, and/or challenge and response for the user account, the user desires to update the account information associated with the user account. This update of information can be performed via a computing device selected by the user, such as a merchant POS device, the user computing device, or via another appropriate computing device able to capture a facial image of the user or communicatively coupled to a computing device able to capture a facial image of the user. The selected computing device displays a request for the user to take a facial picture of himself. In another example, the selected computing device activates an audio component and displays a request for the user to record audio of himself via the computing device. The selected computing device transmits the recorded audio or facial image to the account management system, which generates a facial template or audio template based on the captured image and/or audio from the user. In yet another example, the selected computing device displays the challenge and a request to provide the response as input. The selected computing device receives an input of the response and transmits the response to the account management system.

The account management system compares the generated facial template or audio template against the facial template or audio template associated with the user account. If the difference between the generated facial or audio template and the corresponding template associated with the user account is greater than or equal to a threshold amount, the account management system alerts the selected computing device that the facial template or audio template was not successfully matched to the user account and that the user may not update user account information. In another example, if a similarity between the generated facial or audio template and the corresponding template associated with the user account is less than the threshold amount, the account management system alerts the selected computing device that the facial template or audio template was not successfully matched to the user account and that the user may not update user account information. If the difference between the generated facial or audio template and the corresponding template associated with the user account is less than or equal to a threshold amount, the account management system transmits a notification to the selected computing device that the facial template or audio template was successfully matched to the user account and the user may update user account information. In another example, if a similarity between the generated facial or audio template and the corresponding template associated with the user account is greater than a threshold amount, the account management system transmits a notification to the selected computing device that the facial template or audio template was successfully matched to the user account and the user may update user account information. In another example, in addition to or instead of comparing a generated facial template and/or audio template against a corresponding template associated with the user account, the account management system compares the received response to the challenge against a response associated with a challenge associated with the user account. In this example, if the response received from the selected computing device matches the response associated with the challenge in the user account, the account management system transmits a notification to the selected computing device that the user may update user account information.

In response to receiving a notification from the account management system that the facial template or audio template was successfully matched to the user account and/or that the user may update account information, the selected computing device displays an interface by which a merchant POS device operator or the user may enter updated user account information. In this example, the user enters the updated account information and the selected computing device transmits the updated account information to the account management system. Updating account information may comprise adding information associated with one or more new payment accounts, editing information associated with one or more existing payment accounts, deleting data associated with one or more existing payment accounts, adding personal data, deleting personal data, and/or editing personal data. In this example, personal data may comprise one or more of contact information of the user, demographic information of the user, one or more preferences of the user, one or more permissions granting permission to the account management system to conduct one or more actions with respect to hands free transactions, and/or other relevant personal data. In another example embodiment, updating account information may comprise updating the facial template, audio template, or challenge and response associated with the user account. If successfully updated, the user may engage in hands-free transactions using the updated account information associated with the user account according to the example embodiments described herein.

In certain other example aspects described herein, systems and computer program products to process hands-free transactions with facial recognition of a user and for enabling the user to update account information for use in hands-free transactions via a password comprising a facial template generated based on an image of the user captured at the time the user desires to update the account information are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
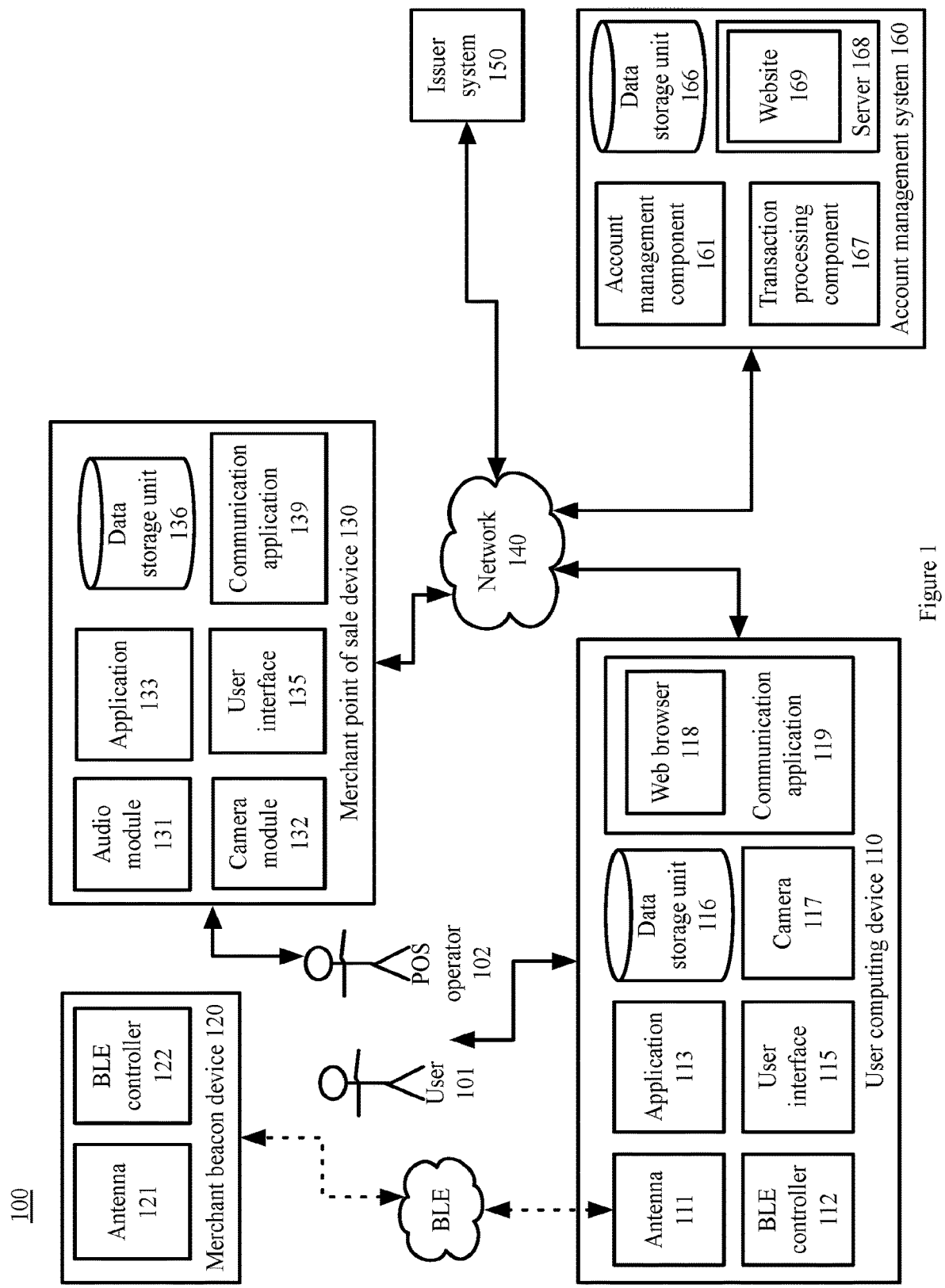
FIG. 1 is a block diagram depicting a system for processing hands-free transactions with facial recognition of a user and for enabling the user to update user account information for use in hands-free transactions via a password comprising a facial template, in accordance with certain example embodiments.

The example embodiments described herein provide computer-implemented techniques for processing hands-free transactions with facial recognition of a user and for enabling the user to update user account information for use in hands-free transactions via a password comprising a facial template.

In an example embodiment, a merchant system registers with an account management system. The merchant system installs one or more merchant beacon devices and one or more merchant POS devices at a merchant location. A user establishes an account with the account management system and downloads an application on a user computing device associated with the user. In an example, the user transmits an image of himself and/or an audio recording of himself to the account management system to establish a facial template and/or audio template associated with the user account. The user enters a merchant location and signs into the application via the user computing device. The user computing device receives a merchant beacon device identifier broadcasted at the merchant location from the merchant beacon device and transmits the merchant beacon device identifier to the account management system. The account management system transmits facial templates, audio templates, and/or challenges and responses to the merchant POS device associated with users whose user computing devices are within network range of the merchant beacon device and who are signed in to the application. Additionally, the account management system generates a payment token for each user whose user computing device is within network range of the merchant beacon device and is signed into the application. An example payment token comprises a series of alphanumeric and/or symbolic characters. The example payment token may be associated with a payment account of the user and be recognizable by an issuer system associated with the payment account of the user. For example, the account management system generates the payment token and communicates the payment token to an issuer system associated with a payment account of the user along with the user payment account information. In this example, if the issuer system, at a later time, receives the payment token from a POS device in a payment transaction, the issuer system can extract the user payment account information associated with the payment token.

A merchant camera device associated with the merchant POS device captures a facial image of the user and the merchant POS device identifies the user based on comparing the captured facial image against the received facial templates. Alternatively, the user submits an audio recording to the merchant POS device, which identifies the user based on comparing the received audio recording against audio templates for users. In yet another embodiment, the merchant POS device operator identifies the user based on a user's response to a challenge. After identifying the user, the merchant POS device processes a transaction using the payment token associated with the user received from the account management system. The merchant POS device generates a transaction authorization request comprising the payment token and transaction details, and transmits the transaction authorization request to an issuer system associated with the user account selected for use in the transaction. The issuer system identifies the user payment account based on the received payment token and processes the transaction using the transaction details and the user payment account information. The merchant POS device receives an approval of the transaction authorization request and transmits a receipt to the merchant POS device.

The user associated with the user account, at a time after initially configuring the user account data, may wish to update the user account data. Example user account data may comprise one or more user payment account information, user demographic information, user contact information, a user facial template, a user audio template, and/or challenge and response for the user account. In another example, the user computing device is stolen from the user and an illegitimate user attempts to reconfigure the user account data for the user account so that the illegitimate user can engage in hands-free transactions using the user computing device of the user. In another example, the illegitimate user attempts to change user account data at a merchant POS device or other appropriate computing device. The user (or other, illegitimate user) or merchant system operator selects an option via the application of the user computing device, merchant POS device, or other computing device to change the user account data. The application activates the camera of the respective computing device and displays a request for the user to take a facial picture of himself. In another example, the application on the merchant POS device, user computing device, or other selected computing device activates an audio component of the respective computing device and displays a request for the user to record audio of himself. The application on the selected computing device transmits the recorded audio or facial image to the account management system, which generates a facial template or audio template based on the captured image and/or audio from the user. The account management system compares the generated facial template or audio template against the facial template or audio template associated with the user account. If the difference between the generated facial or audio template and the corresponding template previously associated with the user account is greater than a threshold amount, the account management system transmits a notification to the application on the respective computing device via the network that the facial template or audio template was not successfully updated. If the difference between the generated facial or audio template and the corresponding template previously associated with the user account is equal to or less than a threshold amount, the account management system associates the generated facial or audio template with the user account and alerts the application on the respective computing device that the facial template or audio template was successfully updated. If successfully updated, the user may engage in hands-free transactions using the updated facial template or updated audio template.

In an example embodiment, a merchant system registers with an account management system. A merchant system operator installs an application on a merchant POS device. In another example, the merchant system operator installs the application on a plurality of merchant POS devices at a merchant location. For example, the application comprises a payment application able to communicate via the network with the account management system and managed by the account management system. A merchant beacon device receives a beacon identifier code from the account management system. For example, the merchant system operator installs one or more merchant beacon devices at the merchant location. The merchant beacon device broadcasts the merchant beacon identifier code via wireless communication at the merchant location. The merchant system operator installs a merchant camera device at the merchant location to correspond to a corresponding merchant POS device. In another example, a plurality of merchant camera devices are installed at the merchant location, each merchant camera device corresponding to a particular merchant POS device. In yet another example, a particular merchant camera device may correspond to two or more particular merchant POS devices.

In an example embodiment, the user registers with an account management system. For example, the user accesses an account management system website via a user computing device associated with the user. The user registers with the account management system and downloads an application onto the user computing device. For example, the application comprises a payment application able to communicate via the network with the account management system and managed by the account management system. In an example embodiment, the account management system establishes a facial template associated with the user account. For example, the application displays a request for the user to capture a facial image via the user computing device. The user selects an option to capture a facial image. The application activates a camera on the user computing device and the users captures a facial image of himself. The account management system receives the facial image. The account management system creates a facial template associated with the user account based on the received facial image. The account management system deletes the received facial image. In another example embodiment, the account management system establishes an audio template associated with the user account. For example, the application requests and receives user audio via the user computing device. The application transmits the received user audio to the account management system and the account management system creates an audio template associated with the user account based on the received audio of the voice of the user. The account management system deletes the received audio of the voice of the user. In yet another example embodiment, the account management system establishes a challenge and response associated with the user account. For example, the application on the user computing device displays a challenge, such as "user initials," and requests a response from the user. In this example, user John Doe may enter "J. D." as the response to the challenge. In this example, the application transmits the entered response to the account management system, which associates the response with the challenge in the user account.

The user signs into the application on the user computing device. The user carries the user computing device within a threshold distance of a merchant beacon device at the merchant location. The user computing device receives a merchant beacon identifier broadcast by the merchant beacon device, and transmits the received merchant beacon identifier and a user account identifier to the account management system. The account management system receives the merchant beacon identifier and the user account identifier. The account management system extracts a facial template associated with the user account identifier and identifies a merchant POS device associated with the merchant beacon device identifier. In another example, the account management system extracts an audio template associated with the user account identifier and/or a challenge and response associated with the user account identifier in addition to or instead of extracting the a facial template associated with the user account identifier.

The account management system transmits a facial template of the identified user to the merchant POS device associated with the merchant beacon device identifier. For example, a facial template associated with the identified user's account is transmitted to the merchant POS device. The merchant POS device receives the facial template of the user, audio template of the user, and/or challenge and response associated with the user.

Additionally, the account management system generates a payment token for each user whose user computing device is within network range of the merchant beacon device and is signed in to the application. An example payment token comprises a series of alphanumeric and/or symbolic characters. The example payment token may be associated with a payment account of the user and be recognizable by an issuer system associated with the payment account of the user. For example, the account management system generates the payment token and communicates the payment token to an issuer system associated with a payment account of the user along with the user payment account information. In this example, if the issuer system, at a later time, receives the payment token from a POS device in a payment transaction, the issuer system is able to extract the user payment account information associated with the payment token.

The merchant POS device associates the payment token, the facial template of the user, the audio template of the user, and the challenge and response of the user in a customer log. The merchant POS device periodically updates the customer log based on updates received from the account management system. For example, the account management system transmits a subsequent facial template, audio template, challenge and response, and payment token for a subsequent user that enters a threshold distance of a merchant beacon device required to establish a wireless network connection while carrying a computing device via which the subsequent user is signed into the application. In this example, the account management system receives the merchant beacon device identifier transmitted by the subsequent user computing device and generates a payment token for the subsequent user. The account management system transmits the facial template of the subsequent user, audio template of the subsequent user, challenge and response of the subsequent user, and the generated payment token to the merchant POS device. In another example, in response to detecting that the computing device associated with a particular user listed on the customer log is no longer maintaining a network connection with the merchant beacon device, is no longer retransmitting the merchant beacon device identifier to the account management system, and/or is no longer signed into the application, the account management system transmits a notice to the merchant POS device that the particular user has left a merchant location. In this example, the merchant POS device deletes the user from the customer log. For example, deleting the user comprises deleting the user account identifier, facial template, audio template, challenge and response, payment token, and/or any other data associated with the particular user from the merchant POS device.

The user approaches the merchant POS device. The merchant POS device operator totals items of the user for purchase. The merchant POS device operator asks the user to select a payment option. The user directs the merchant POS device operator to initiate a transaction via the application. The merchant POS device operator selects an option on the merchant POS device to initiate a transaction using the application.

The merchant camera device, communicatively coupled to the merchant POS device, captures video of the user. For example, the user is positioned in front of the POS device and the merchant camera device is positioned to be able to capture a video of the user's face. In an example embodiment, the merchant camera device starts capturing video of the user only when the merchant POS device receives an input from an operator of the merchant POS device to identify the user. In another example embodiment, the merchant camera device starts capturing video when the associated merchant POS device receives an indication from the account management system that a user computing device has established a network connection with the merchant beacon device and/or retransmitted the merchant beacon device identifier to the account management system. In this example embodiment, the merchant camera device does not capture video when there are no users with associated user computing devices within network range of the merchant beacon device. The merchant camera device extracts a facial image of the user from the captured video and generates a facial template from the captured facial image. The merchant camera device deletes the captured video and extracted facial image and transmits the facial template to the merchant POS device. In another example, the merchant camera device transmits the facial image of the user to the merchant POS device and the merchant POS device generates the facial template from the facial image.

The merchant POS device retrieves facial templates from the customer log. For example, the customer log comprises a list of users and associated facial templates for each of the users that have computing devices with an established a network connection to the merchant beacon device at the merchant location and/or have retransmitted the merchant beacon device identifier to the account management system. In an example embodiment, the customer log comprises volatile or transient memory. For example, the customer log is not saved and user information is added or deleted from the customer log as user computing devices associated with respective users enter or leave a network range of the merchant beacon device. The merchant POS device compares the generated facial template from the extracted facial image to facial templates from the customer log. The merchant POS device is able to identify the user if there is a match between a facial template from the customer log and the generated facial template. The merchant POS device is unable to identify the user if there is no match between a facial template from the customer log and the generated facial template. If the merchant POS device is able to identify the user, the merchant POS device notifies the account management system of the identity of the user and the account management system processes a transaction between the user and the merchant system. In an example embodiment, if the merchant POS device is able to identify the user, but is unable to notify the account management system of the identity of the user, the merchant POS device processes the transaction using the received payment token associated with user account of the identified user.

In an example embodiment, if the user cannot be identified based on facial recognition, the merchant POS device identifies the user based on audio recognition. In an example embodiment, if the account management system identifies users based on audio recognition, the account management system retrieves audio templates corresponding to users from the customer log. The merchant POS device displays a request to record an audio of the user via a user interface of the merchant POS device. The merchant POS device records a voice input of the user and compares the received voice input to the retrieved audio templates that correspond to the users from the customer log. The merchant POS device is able to identify the user if there is a match between an audio template from the customer log and the received voice input of the user. The merchant POS device is unable to identify the user if there is no match between an audio template from the customer log and the received voice input of the user. If the merchant POS device is able to identify the user, the merchant POS device notifies the account management system of the identity of the user and the account management system processes the transaction between the user and the merchant system. In an example embodiment, if the merchant POS device is able to identify the user, but unable to notify the account management system of the identity of the user, the merchant POS device processes a transaction using the received payment token associated with user account of the identified user.

If the merchant POS device is unable to identify the user based on facial and/or voice recognition, the merchant POS device operator is notified, via a display on the merchant POS device, to issue a challenge to the user. The user provides a challenge response and the merchant POS operator inputs the response into the merchant POS device. The merchant POS device displays potential users from the customer log based on the challenge response. For example, the merchant POS device accesses the customer log comprising a list or table that associates each challenge with corresponding the response, the user account identifiers, and the payment tokens. In this example, the merchant POS device identifies the user by correlating the challenge and the response to identify one or more users in the customer log. In this example, the merchant POS device displays the one or more identified users to the merchant POS device operator. The merchant POS device operator selects a user. In an example, the merchant POS device operator may compare a visual image or name of the user displayed on the user computing device to the visual appearance of the current customer at the merchant POS device and/or documentation presented by the user to the merchant POS operator. In an example, the merchant POS device transmits the identity of the user identified by the merchant POS operator. If the merchant POS device operator is able to identify the user via the challenge and response, the merchant POS device notifies the account management system of the identity of the user and the account management system processes the transaction between the user and the merchant system. If the merchant POS device operator is unable to identify the user via the challenge and response, the merchant POS device operator cancels the transaction by actuating one or more objects on the user interface of the merchant POS device. In an example embodiment, if the merchant POS device is able to identify the user, but unable to notify the account management system of the identity of the user, the merchant POS device processes a transaction using the received payment token associated with user account of the identified user.

The merchant POS device operator confirms the transaction with permission of the user. In an example embodiment, the merchant POS device generates a transaction authorization request based on transaction details and the payment token associated with the user retrieved from the customer log. For example, transaction details may comprise a total amount of the transaction, a selected user account for use in the transaction, an account of the merchant for use in the transaction, and other useful or relevant information. The merchant POS device transmits a transaction authorization request to an issuer system. For example, the issuer system is associated with a user payment account selected for use by the user in all hands free transactions involving the application. The issuer system approves or denies the transaction authorization request and transmits a transaction authorization approval or denial of transaction authorization request to the merchant POS device. The merchant POS device transmits a transaction receipt to the user computing device and/or prints or displays a receipt for the user at the merchant POS device indicating a status of the transaction. For example, the merchant POS device displays an indication that the transaction was successfully processed or that the transaction was denied.

In another example embodiment, the merchant POS device transmits an indication of an identity of the user identified via facial, audio, and/or challenge and response to the account management system along with the transaction details. In this example embodiment, the account management system processes the transaction with the issuer system. For example, the account management system generates a transaction authorization request comprising the payment token, where the transaction authorization request is based on user account information and the transaction details. In an example, the merchant POS device transmits the transaction authorization request to the issuer system. In this example, the issuer system receives the transaction authorization request, approves or denies the transaction authorization request, and transmits either a denial of transaction authorization request or an approval of the transaction authorization request to the account management system. For example, the issuer system identifies the user payment account associated with the payment token. In an example embodiment, the transaction authorization request comprises a total transaction amount, and the issuer system determines whether the transaction would result in the user exceeding the user's credit limit associated with the user payment account. The issuer system may base a decision to approve a transaction authorization request based on considerations other than the total transaction amount or the user's credit limit on the payment account.

In an example embodiment, the account management system transmits notification of an approved or denied transaction to the merchant POS device and/or to the user computing device. In this example embodiment, the merchant POS device and/or the user computing device displays or otherwise indicates to the user a status of the transaction. For example, the user computing device receives and displays a text message from the account management system indicating to the user that the transaction was denied.

In an example embodiment, the user associated with the user account audio template, and/or challenge and response for the user account, may wish to update user account data associated with the user account at a time after initially configuring a facial template. Updating account information may comprise adding information associated with one or more new payment accounts, editing information associated with one or more existing payment accounts, deleting data associated with one or more existing payment accounts, adding personal data, deleting personal data, and/or editing personal data. In this example, personal data may comprise contact information of the user, demographic information of the user, one or more preferences of the user, one or more permissions granting permission to the account management system to conduct one or more actions with respect to hands free transactions, and/or other relevant personal data. In another example embodiment, updating account information may comprise updating the facial template, audio template, or challenge and response associated with the user account. In another example embodiment, the user computing device is stolen and an illegitimate user attempts to reconfigure the user account data associated with the user account so that the illegitimate user can engage in hands-free transactions using the user computing device of the user.

In an example, the user requests to change user account data at a merchant POS device at the merchant location. In another example embodiment, the user requests to change user account data using the user computing device. In other example embodiments, user may request to change user account data at another appropriate computing device. In the example where the user requests to change user account data at the merchant POS device, the merchant POS device operator may select one or more objects on the user interface of the merchant POS device to provide an input indicating to the merchant POS device that the user desires to change user account data. In this example, in response to receiving the input of a request to change user account data associated with the user account, the merchant POS device transmits a request to the merchant camera device to identify the user. In this example, the merchant camera device, in response to receiving the request to identify the user, captures a facial image of the user. In this example, the merchant POS device transmits the captured facial image to the account management system via a network. In this example, the account management system receives the captured facial image via the network and generates a facial template based on the captured facial image. In this example, the account management system deletes the received captured facial image after successfully generating the facial template based on the captured facial image. In this example, the account management system compares the generated facial template against the existing facial template associated with the existing account.

An example method for updating user account data via the user computing device may be similar to the method for updating user account data via the merchant POS device. For example, the user may request, by selecting one or more objects on a user interface of the user computing device, to provide an input indicating to the user computing device that the user desires to change user account data. In this example, in response to receiving the input of a request to change user account data associated with the user account, the user computing device displays a request for the user to capture a facial image of the user. In this example, the user captures a facial image of the user via the user computing device by selecting an object on the user interface of the user computing device. In this example, the user computing device transmits the captured facial image to the account management system via a network. In this example, the account management system receives the captured facial image via the network and generates a facial template based on the captured facial image. In this example, the account management system deletes the received captured facial image after successfully generating the facial template based on the captured facial image. In this example, the account management system compares the generated facial template against the existing facial template associated with the existing account.

In an example embodiment, if the difference between the generated facial or audio template and the corresponding template previously associated with the user account is greater than or equal to a threshold amount, the account management system alerts the merchant POS device or user computing device that the facial template or audio template was not successfully matched to the user account and that the user may not update user account information. In another example, if a similarity between the generated facial or audio template and the corresponding template previously associated with the user account is less than a threshold amount, the account management system alerts the application on the merchant POS device or user computing device that the facial template or audio template was not successfully matched to the user account and that the user may not update user account information. If the difference between the generated facial or audio template and the corresponding template previously associated with the user account is equal to or less than a threshold amount, the account management system transmits a notification to the POS device or the user computing device that the facial template or audio template was successfully matched to the user account and the user may update user account information. In another example, if a similarity between the generated facial or audio template and the corresponding template previously associated with the user account is greater than or equal to a threshold amount, the account management system transmits a notification to the POS device or user computing device that the facial template or audio template was successfully matched to the user account and the user may update user account information.

In response to receiving a notification from the account management system that the facial template or audio template was successfully matched to the user account and that the user may update account information, the POS device or user computing device may display an interface by which the merchant POS device operator or user may enter updated account information. In this example, the user enters the updated account information and the POS device or user computing device transmits the updated account information to the account management system. Updating account information may comprise adding information associated with one or more new payment accounts, editing information associated with one or more existing payment accounts, deleting data associated with one or more existing payment accounts, adding personal data, deleting personal data, and/or editing personal data. In this example, personal data may comprise contact information of the user, demographic information of the user, one or more preferences of the user, one or more permissions granting permission to the account management system to conduct one or more actions with respect to hands free transactions, and/or other relevant personal data. In another example embodiment, updating account information may comprise updating the facial template, audio template, or challenge and response associated with the user account. If successfully updated, the user may engage in hands-free transactions using the updated account information associated with the user account according to the example embodiments described herein. For example, in updating the user account information, the user added new payment account information. In this example, after updating the user account information, the user may conduct hands-free transactions according to the methods described herein using the new payment account information.

In certain example embodiments, when transmitting facial images to the account management system, the application on the merchant POS device or the user computing device first sends a low resolution facial image to the account management system. The account management system compares the low resolution facial image against the facial template associated with the account of the user. If the difference between the received low resolution image and the corresponding facial template previously associated with the user account is greater than or equal to a threshold amount, the account management system alerts the application on the merchant POS device or user computing device that the facial template does not match the facial template associated with the user account. If the difference between the received low resolution image and the corresponding facial template previously associated with the user account is greater than or equal to a threshold amount, the account management system transmits a request for a higher resolution image to the application on the merchant POS device or user computing device. The application on the merchant POS device or user computing device sends a high resolution facial image to the account management system. The account management system generates a facial template and compares the generated template against the template associated with the account of the user. If the difference between the generated facial template and the corresponding facial template previously associated with the user account is equal to or less than a threshold amount, the account management system transmits notification to the application on the user computing device or to the application on the merchant POS device that the user may update account data and the application or merchant POS device may display a request updated account data from the user, receive an input of updated account data from the user, and transmit the updated account information to the account management system. The account management system may the associate the updated account information with the user account. If successfully updated, the user may engage in hands-free transactions using the updated account data.

In other examples, in response to determining that the difference between the generated facial template and the corresponding facial template currently associated with the user account is greater than a threshold amount or that a similarity between the generated facial template and the corresponding facial template previously associated with the user account is less than a threshold amount, the account management system transmits, via the network, an alert to the application on to the merchant POS device or user computing device that the facial template was not successfully matched to the user account and requests a response by the user to a challenge. In this example, the application on the merchant POS device or user computing device displays the challenge to the user and the user inputs the response. In this example, the application on the merchant POS device or user computing device transmits, to the account management system, the response received from the user. The account management system verifies the response to the challenge. For example, the account management system extracts the response associated with the challenge associated with the user account and determines whether the response provided by the user via the user computing device or merchant POS device matches, exactly or substantially, the response associated with the user account. For example, the responses match substantially if the account management system determines that the similarity of response received from the user to the response associated with the user account is greater than or equal to a predefined threshold. In this example, the responses do not match substantially if the account management system determines that the similarity of the response received from the user to the response associated with the user account is less than a predefined threshold. If the response provided by the user matches, exactly or substantially, the response associated with the user account, the account management system associates the generated user facial template or audio template with the user account. If the response provided by the user does not match the response, exactly or substantially, associated with the user account, the account management system transmits an alert to the application notifying the user that the facial template or audio template was not successfully updated.

By using and relying on the methods and systems described herein, the account management system, the merchant beacon device, the user computing device, and the merchant POS device enable the user to conduct a transaction with the merchant system without the user having to interact with the user computing device or produce identity documents or physical payment cards, as required in some current technology. As such, the systems and methods described herein may reduce the inputs required by the user via the user computing device and the inputs required by the merchant POS device operator to identify the user. Further, by using and relying on the methods and systems described herein, the account management system and the user computing device may increase the security of hands-free transactions by insuring that user biometric account data and payment account data, such as user images and user payment account data, contact information, or demographic data, cannot easily be changed by illegitimate users attempting to use the user's computing device in a hands free transaction.

Example System Architecture

Turning now to the drawings, in which like numerals indicate like (but not necessarily identical) elements throughout the figures, example embodiments are described in detail.

FIG. 1 is a block diagram depicting a system 100 for processing hands-free transactions with facial recognition of a user 101 and for enabling the user 101 to update user 101 account information for use in hands-free transactions via a password comprising a facial template, in accordance with certain example embodiments. As depicted in FIG. 1, the system 100 includes network computing devices 110, 120, 130, 150, and 160 that are configured to communicate with one another via one or more networks 120. In some embodiments, a user associated with a device must install an application and/or make a feature selection to obtain the benefits of the techniques described herein.

In example embodiments, the network 140 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, 150, and 160 includes a device having a communication component capable of transmitting and receiving data over the network 140. For example, each network computing device 110, 120, 130, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 150, and 160 are operated by users 101, merchant beacon device 120 operators, merchant POS ("POS") device 130 operators, issuer system 150 operators, and account management system 160, respectively.

An example user computing device 110 comprises an antenna 111, a Bluetooth Low Energy ("BLE") controller 112, a application 113, a user interface 115, a data storage unit 116, a camera 117, a web browser 118, and a communication application 119.

In an example embodiment, the antenna 111 is a means of communication between the user computing device 110 and a merchant beacon device 120. In an example embodiment, a BLE controller 112 outputs through the antenna 111 a radio signal, or listens for radio signals from the merchant beacon device 120. In another example embodiment a Bluetooth controller, Wi-Fi controller, or a near field communication ("NFC") controller is used. In an example embodiment, the BLE controller 112 outputs through the antenna 111 a radio signal, or listens for radio signals from the merchant beacon device 120.

In an example embodiment, the BLE controller 112 is capable of sending and receiving data, performing authentication and ciphering functions, and directing how the user computing device 110 will listen for transmissions from the merchant beacon device 120 or configuring the user computing device 110 into various power-save modes according to BLE-specified procedures. In another example embodiment, the user computing device 110 comprises a Bluetooth controller, Wi-Fi controller or an NFC controller capable of performing similar functions. An example BLE controller 112 communicates with the application 113 and is capable of sending and receiving data over a wireless, BLE communication channel. In another example embodiment, a Bluetooth controller 112, Wi-Fi controller 112, or NFC controller 112 performs similar functions as the BLE controller 112 using Bluetooth, Wi-Fi, or NFC protocols. In an example embodiment, the BLE controller 112 activates the antenna 111 to create a wireless communication channel between the user computing device 110 and the merchant beacon device 120. The user computing device 110 communicates with the merchant beacon device 120 via the antenna 111. In an example embodiment, when the user computing device 110 has been activated, the BLE controller 112 polls through the antenna 111 a radio signal, or listens for radio signals from the merchant beacon device 120.

In an example embodiment, the application 113 is a program, function, routine, applet, or similar entity that exists on and performs its operations on the user computing device 110. In certain example embodiments, the user 101 must install the application 113 and/or make a feature selection on the user computing device 110 to obtain the benefits of the techniques described herein. In an example embodiment, the user 101 may access application 113 on the user computing device 110 via the user interface 115. In an example embodiment, the application 113 may be associated with the account management system 160. In another example embodiment, the application 113 may be associated with a merchant system associated with the merchant beacon device 120 and/or the merchant POS device 130.

In an example embodiment, the user interface 115 enables the user 101 to interact with the application 113 and/or web browser 118. For example, the user interface 115 may be a touch screen, a voice-based interface, or any other interface that allows the user 101 to provide input and receive output from an application, function, or component on the user computing device 110. In an example embodiment, the user 101 interacts via the user interface 115 with the application 113 and/or web browser 118 to configure user 101 accounts with the account management system 160. In another example embodiment, the user 101 interacts via the user interface 115 with the application 113 and/or the web browser 118 to enable hands-free payments, if needed.

In an example embodiment, the data storage unit 116 comprises a local or remote data storage structure accessible to the user computing device 110 suitable for storing information. In an example embodiment, the data storage unit 116 stores encrypted information, such as HTML5 local storage.

In an example embodiment, the camera 117 may be any application, component, or function of the user computing device 110 that captures a digital image. The camera 117 may be resident on the user computing device 110 or in any manner logically connected to the user computing device 110. For example, the camera 117 may be connected to the user computing device 110 via the network 140. The camera 117 may be capable of obtaining individual images or a video scan. Any other suitable image capturing device may be represented by the camera 117.

In an example embodiment, the user 101 can use a communication application 119, such as a web browser 118 application or a stand-alone application, to view, download, upload, or otherwise access documents or web pages via a distributed network 140.

In an example embodiment, the web browser 118 can enable the user 101 to interact with web pages using the user computing device 110. In an example embodiment, the user 101 may access the user's 101 account maintained by the account management system 160 via the web browser 118. In another example embodiment, the user 101 may access a merchant system website or an account management system website 169 via the web browser 118. In certain example embodiments described herein, one or more functions performed by the application 113 may also be performed by a web browser 118 application associated with the account management system 160.

In an example embodiment, the communication application 119 can interact with web servers or other computing devices connected to the network 140, including a web server of a merchant system and a web server 168 of the account management system 160.

In certain example embodiments, one or more functions herein described as performed by the application 113 may also be performed by a web browser 118 application or communication application 119, for example, a web browser 118 application associated with a merchant system website or associated with the account management system 160. In certain example embodiments, one or more functions herein described as performed by the application 113 may also be performed by the user computing device 110 operating system. In certain example embodiments, one or more functions herein described as performed via the web browser 118 may also be performed via the application 113.

An example merchant beacon device 120 comprises an antenna 121 and a Bluetooth Low Energy ("BLE") controller 122. In an example embodiment, a merchant location comprises one or more merchant beacon devices 120 installed at the merchant location. In an example embodiment, each installed merchant beacon device 120 is associated by an account management system 160 with a particular merchant POS device 130 installed at the merchant location. For example, the account management system 160 may comprise a database that correlates merchant beacon device 120 identifiers with merchant POS device 130 identifiers for associated merchant POS devices 130. For example, a merchant POS device 130 identifier may comprise hardware identifier specific to the device such as a serial number or a media access control ("MAC") identifier. In another example, a merchant beacon device 120 identifier may comprise a hardware identifier specific to the beacon device or an identifier generated by the account management system 160 and stored in the merchant beacon device 120. An example merchant beacon device 120 is programmed to broadcast, emit, or otherwise transmit a particular merchant beacon device 120 identifier over a local wireless network, for example, a BLE network, to any user computing devices 110 within a threshold distance required to maintain the wireless network 140. For example, the wireless network may comprise a BLE network 140, a Wi-Fi network 140, a Bluetooth network 140, an NFC network 140, or any other appropriate wireless network 140.

In an example embodiment, the antenna 121 is a means of communication between the user computing device 110 and a merchant beacon device 120. In an example embodiment, a BLE controller 122 outputs through the antenna 121 a radio signal, or listens for radio signals from the user computing device 110. In another example embodiment a Bluetooth controller, Wi-Fi controller, or a near field communication ("NEC") controller is used. In an example embodiment, the BLE controller 122 outputs through the antenna 121 a radio signal, or listens for radio signals from the user computing device 110.

In an example embodiment, the BLE controller 122 is capable of sending and receiving data, performing authentication and ciphering functions, and directing how merchant beacon device 120 will listen for transmissions from the user computing device 110 or configuring the merchant beacon device 120 into various power-save modes according to BLE-specified procedures. In another example embodiment, the merchant beacon device 120 comprises a Bluetooth controller, Wi-Fi controller or an NFC controller capable of performing similar functions. An example BLE controller 122 communicates with the application 113 and is capable of sending and receiving data over a wireless, BLE communication channel. In another example embodiment, a Bluetooth controller 122, a Wi-Fi controller 122, or an NFC controller 122 performs similar functions as the Wi-Fi controller 122 using Bluetooth, Wi-Fi, or NFC protocols. In an example embodiment, the BLE controller 122 activates the antenna 121 to create a wireless communication channel between the user computing device 110 and the merchant beacon device 120. The merchant beacon device 120 communicates with the user computing device 110 via the antenna 121. In an example embodiment, when the merchant beacon device 120 has been activated, the BLE controller 122 polls through the antenna 121 a radio signal, or listens for radio signals from the user computing device 110.

An example merchant POS device 130 comprises an audio component 131, a camera 132, an application 133, a user interface 135, a data storage unit 136, and a communication application 139.

In an example embodiment, the audio component 131 may be any component, function, or application of the merchant POS device 130 that captures an audio input of an external environment of the merchant POS device 130. The audio component 131 may be resident on the merchant POS device 130 or in any manner logically connected to the merchant POS device 130. For example, the audio component 131 may be connected to the merchant POS device 130 via the network 140. The audio component 131 may be capable of obtaining an audio recording. Any suitable audio recording device may be represented by the audio component 131. For example, the audio component 131 may comprise a microphone.

In an example embodiment, the camera 132 may be any function, component, or application of the merchant POS device 130 that captures an image or video input of an external environment of the merchant POS device 130. The camera may be resident on the merchant POS device 130 or in any manner logically connected to the merchant POS device 130. For example, the audio component 131 may be connected to the merchant POS device 130 via the network 140. The camera 132 may be capable of capturing one or more images or recording a video recording. Any suitable image capturing and/or video recording device may be represented by the camera 132.

In an example embodiment, the application 133 is a program, function, routine, applet, or similar entity that exists on and performs its operations on the merchant POS device 130. In certain example embodiments, the merchant POS ("POS") device operator 102 or other merchant system operator must install the application 133 and/or make a feature selection on the merchant POS device 130 to obtain the benefits of the techniques described herein. In an example embodiment, the merchant POS device operator 102 may access the application 133 on the merchant POS device 130 via the user interface 135 of the merchant POS device 130. In an example embodiment, the application 133 may be associated with the account management system 160. In another example embodiment, the application 133 may be associated with a merchant system associated with the merchant beacon device 120 and the merchant POS device 130.

In an example embodiment, the user interface 135 enables the merchant POS device operator 102 to interact with the merchant POS device 130. For example, the user interface 135 may be a touch screen, a voice-based interface, or any other interface that allows the merchant POS device operator 102 to provide input and receive output from an application, component, or function on the merchant POS device 130. In an example embodiment, the merchant POS device operator 102 interacts via the user interface 135 with the application 133.

In an example embodiment, the data storage unit 136 comprises a local or remote data storage structure accessible to the merchant POS device 130 suitable for storing information. In an example embodiment, the data storage unit 136 stores encrypted information, such as HTML5 local storage.

In an example embodiment, the communication application 139, such as a web browser application or a stand-alone application, enables an operator of the merchant POS device 130 to view, download, upload, or otherwise access documents or web pages via a distributed network 140. For example, the communication application 139 may enable communication over the network 140 with the account management system 160, and/or an issuer system 150.

An example issuer system 150 approves or denies a payment authorization request received from the merchant POS device 130. In an example embodiment, the issuer system 150 communicates with the merchant POS device 130 over the network 140. In an example embodiment, the issuer system 150 communicates with an acquirer system to approve a credit authorization for the user 101 and to make payment to the merchant system. For example, the acquirer system is a third party payment processing system. In other example embodiments, the issuer system 150 receives the payment authorization request from the account management system 160 via the network 140.

An example account management system 160 comprises an account management component 161, a facial recognition component 163, an audio recognition component 165, a data storage unit 166, a transaction processing component 167, a server 168, and a website 169.

In an example embodiment, the account management component 161 manages one or more user 101 accounts. In an example embodiment, a user 101 account may comprise a digital wallet account, an email account, a social networking account, or any other appropriate account associated with the account management system 160. In an example embodiment, the account management system 161 communicates with an application 113 operating on a user computing device 110 associated with a user 101 having a user 101 account maintained by the account management system 160. In an example embodiment, the user 101 enters payment account information into the user 101 account via the application 113. The account management component 161 receives the payment account information over the network 140 and associates the received payment account information with the user 101 account.

In an example embodiment, the data storage unit 166 comprises a local or remote data storage structure accessible to the account management system 160 suitable for storing information. In an example embodiment, the data storage unit 166 stores encrypted information, such as HTML5 local storage.

In certain example embodiments, the transaction processing component 167 receives transaction details from a merchant POS device 130 and a request to initiate a transaction. Example transaction details comprise merchant system account information, a total amount of the transaction, and a user 101 selection of a user 101 payment account associated with the user's 101 account with the account management system 160. For example, the user's 101 account is a digital wallet account comprising information for one or more payment accounts. In an example embodiment, the transaction processing component 167 extracts payment account information from the user 101 account corresponding to the user 101 selection of the user 101 payment account received in the transaction details from the merchant POS device 130. In an example embodiment, the transaction processing component 167 transmits a payment authorization request to an issuer system 150 or other appropriate financial institution associated with the payment account selected by the user 101 for use in the transaction. An example payment authorization request may comprise merchant system payment account information, user 101 payment account information, and a total amount of the transaction. In an example embodiment, after the issuer system 150 processes the payment authorization request, the transaction processing component 167 receives an approval or denial of the payment authorization request from the issuer system 150 over the network 140. In an example embodiment, the transaction processing component 167 transmits a receipt to the merchant POS device 130 and/or the user computing device 110 comprising a summary of the transaction.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant POS device 130, the issuer system 150, and the account management system 160 illustrated in FIG. 1 can have any of several other suitable computer system configurations. For example, a user computing device 110 embodied as a mobile phone or handheld computer may or may not include all the components described above.

Figure 16:
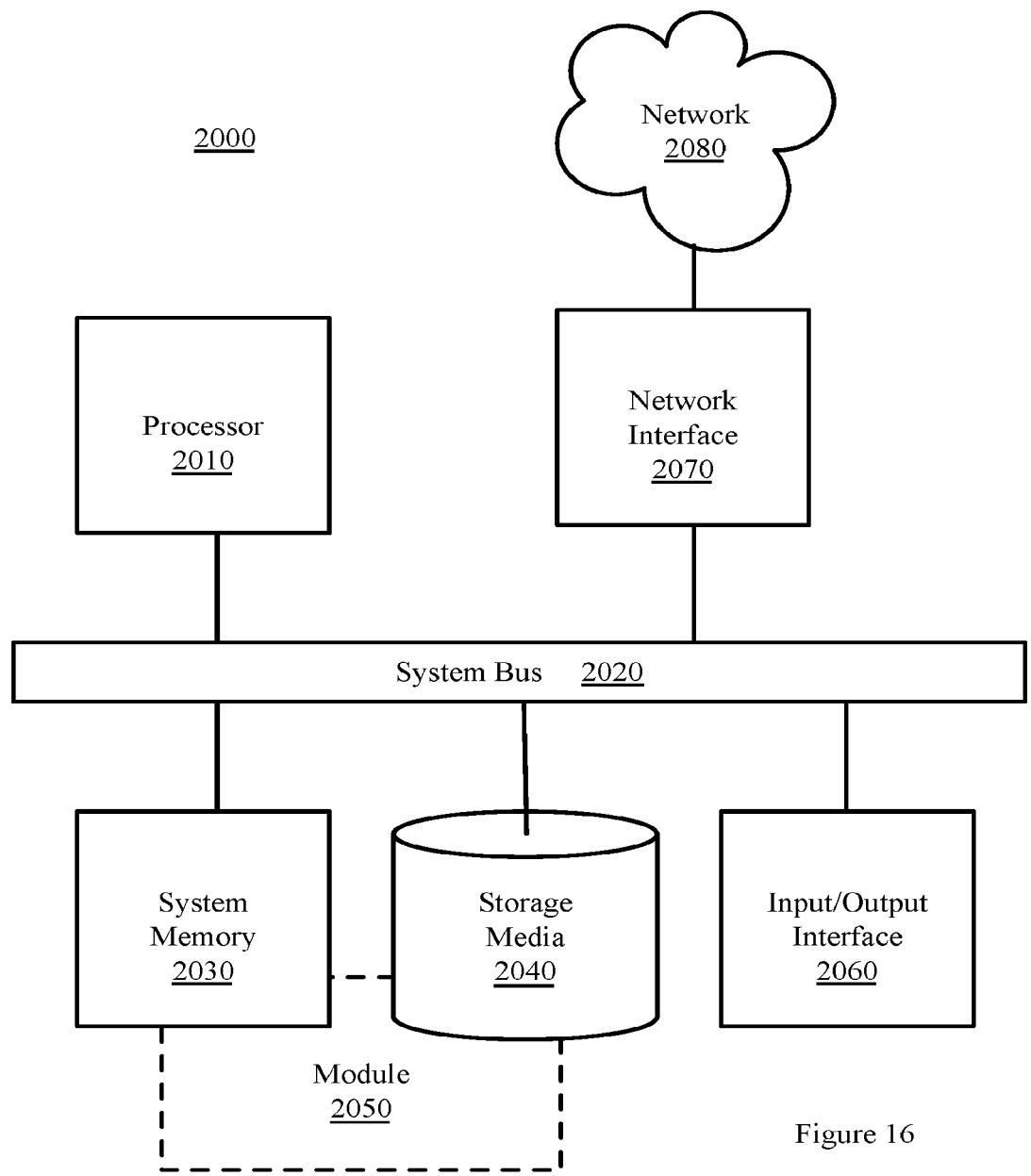
FIG. 16 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 16. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 16. The computing machines discussed herein may communicate with one another, as well as with other computing machines or communication systems over one or more networks, such as network 170. The network

170 may include any type of data or communications network, including any of the network technology discussed with respect to FIG. 16.

Example Processes

The example methods illustrated in FIGS. 2-15 are described hereinafter with respect to the components of the example operating environment 100. The example methods of FIGS. 2-15 may also be performed with other systems and in other environments.

Figure 2:
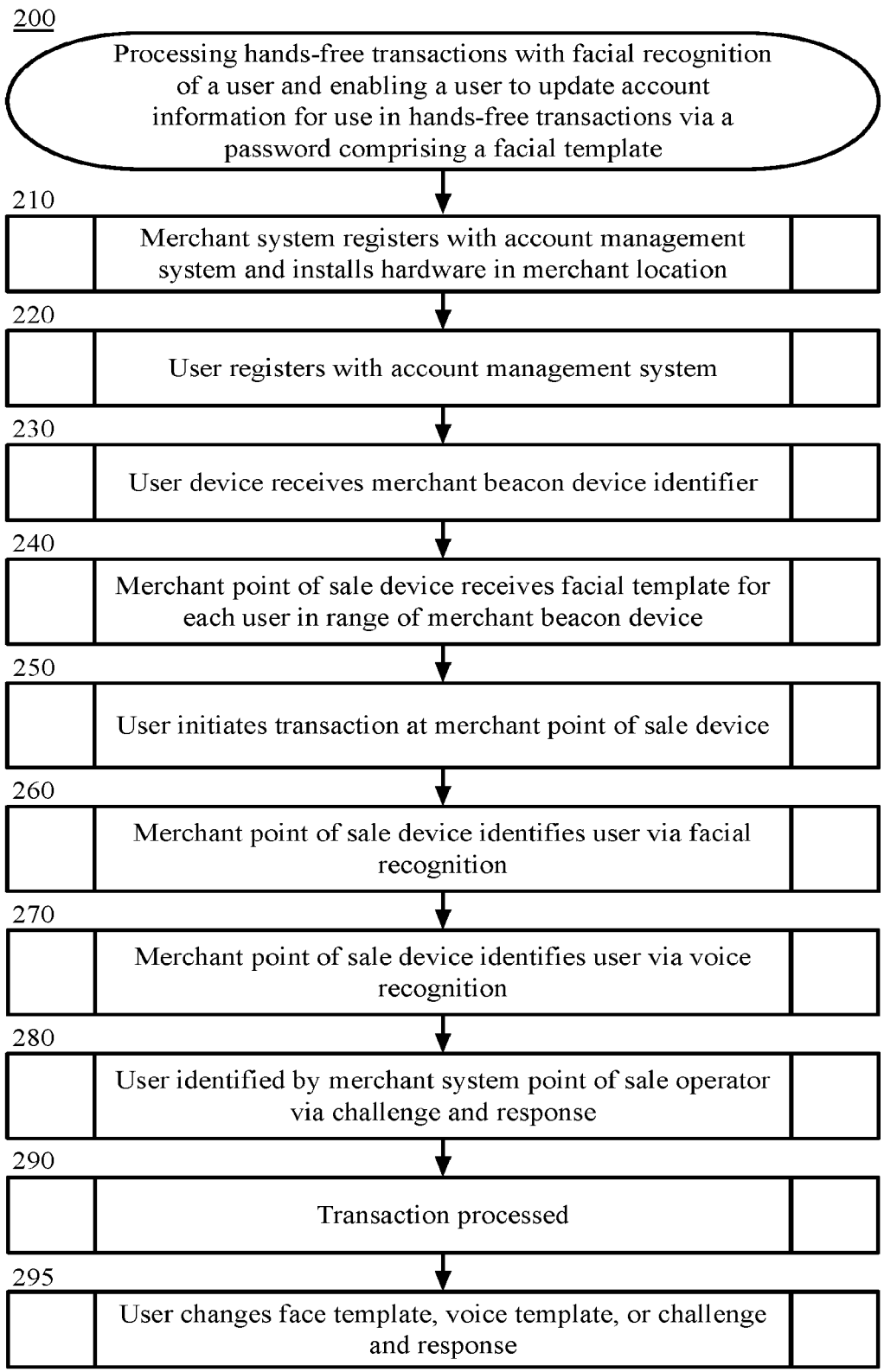
FIG. 2 is a block flow diagram depicting a method for processing hands-free transactions with facial recognition of a user and for enabling the user to update user account information for use in hands-free transactions via a password comprising a facial template, in accordance with certain example embodiments.

FIG. 2 is a block diagram depicting a method 200 for processing hands-free transactions with facial recognition of a user 101 and for enabling a user 101 to update user 101 account information for use in hands-free transactions via a password comprising a facial template, in accordance with certain example embodiments. The method 200 is described with reference to the components illustrated in FIG. 1.

In block 210, the merchant system registers with the account management system 160 and installs hardware in a merchant location. The method for registering with an account management system 160 and installing hardware at a merchant location is described in more detail hereinafter with reference to the method described in FIG. 3.

Figure 3:
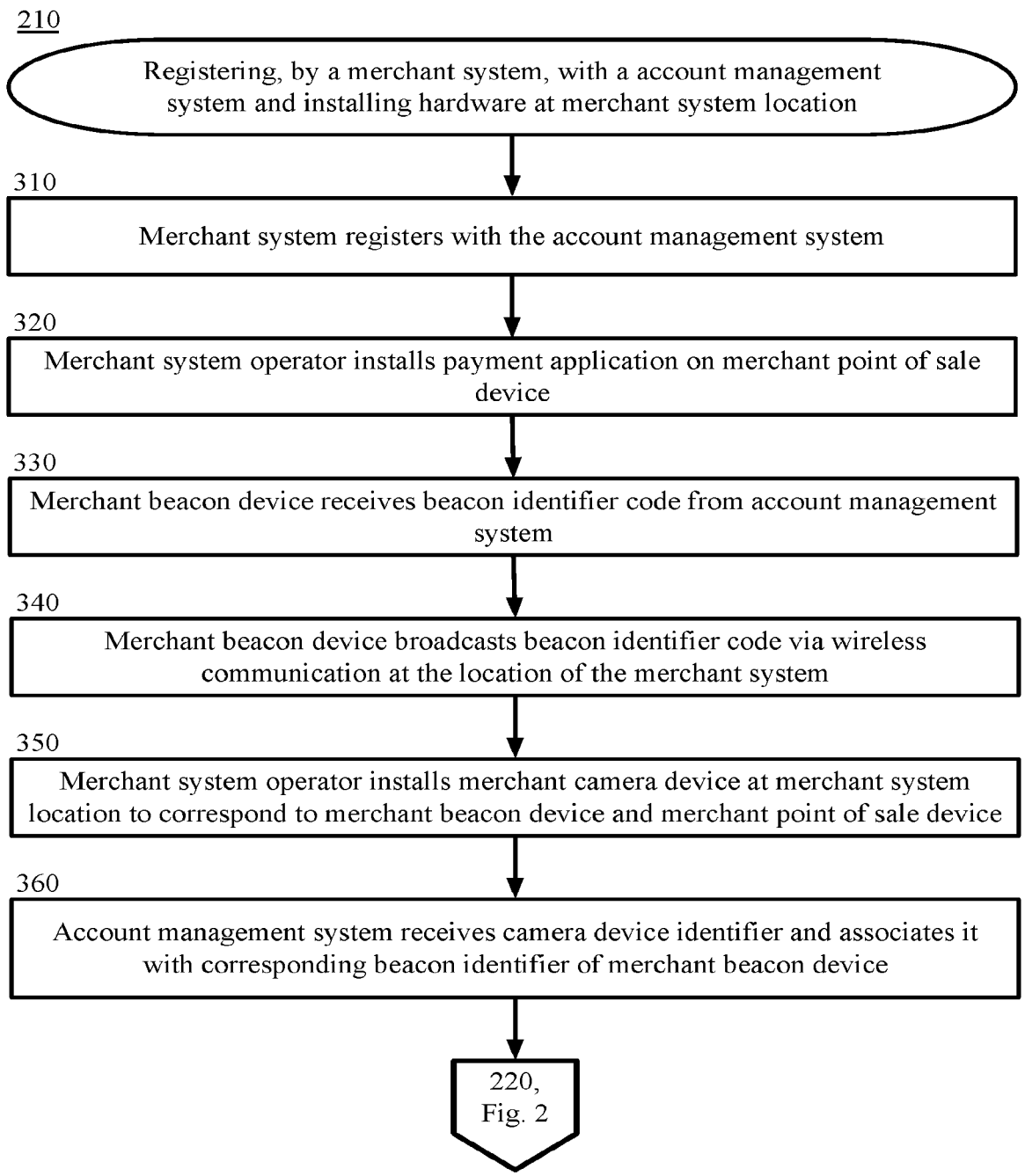
FIG. 3 is a block flow diagram depicting a method for registering, by a merchant system, with an account management system and installing hardware at a merchant location, in accordance with certain example embodiments.

FIG. 3 is a block diagram depicting a method 210 for registering, by a merchant system, with an account management system 160 and installing hardware at a merchant location, in accordance with certain example embodiments. The method 210 is described with reference to the components illustrated in FIG. 1.

In the example embodiments described herein, the merchant system does not need to install hardware at the example merchant location in any particular order. The method 210 describes one example method of installing hardware at the merchant location. However, the merchant system or other system installing the merchant hardware does not need to install the merchant POS device 130, the merchant POS device 130, or the merchant beacon device 120 in the order described herein.

In block 310, a merchant system registers with the account management system 160. In an example embodiment, an agent of the merchant system accesses an account management system 160 website and registers for a merchant account with the account management system 160 via the website. In an example embodiment, the merchant system adds payment account information associated with a merchant account to the merchant account managed by the account management system 160. In an example embodiment, the merchant system comprises one or more merchant locations. For example, the merchant system may comprise one or more physical store locations. An example merchant location comprises one or more merchant POS ("POS") devices 130. In an example embodiment, one or more merchant POS device operators 102 operate the one or more merchant POS devices 130 at the merchant location.

In block 320, a merchant system operator installs the application 133 on the merchant POS device 130. In another example embodiment, the merchant system operator purchases a merchant POS device 130 from the account management system 160 with the application 133 pre-installed on the merchant POS device 130. In an example embodiment, the merchant POS device 130 is able to communicate with the account management system 160 over a network 140. In an example embodiment, the merchant POS device 130 communicates with the account management system 160 via the application 133. For example, the merchant POS device 130 may be able to transmit transaction details to the account management system 160 via the application 133 over the network 140 to enable the account management system 160 to process a transaction. In another example, the merchant POS device 130 receives a receipt from the account management system 160 that notifies a merchant POS device operator 102 as to whether a transaction was successful or not.

In block 330, the merchant beacon device 120 receives a beacon identifier from the account management system 160. In an example embodiment, the merchant system receives a beacon identifier from the account management system 160 and installs or otherwise saves the beacon identifier on the merchant beacon device 120. In an example embodiment, a merchant system operator installs the merchant beacon device 120 in proximity to a merchant POS device 130. In an example embodiment, the merchant system operator installs a plurality of merchant beacon devices 120, each merchant beacon device 120 in proximity to one or more associated merchant POS devices 130. In an example embodiment, the merchant beacon device 120 is able to broadcast a merchant beacon identifier over a wireless medium. One or more user computing devices 110 located within a threshold proximity to the merchant beacon device 120 are able to receive the merchant beacon identifier over the wireless medium. In another example embodiment, the merchant beacon device 120 is able to establish a local network 140 connection to one or more user computing devices 110 located within a threshold proximity to the merchant beacon device 120 and the merchant beacon device 120 transmits the merchant beacon identifier to the one or more user computing devices 110 over the established local network 140 connection. For example, the threshold proximity depends on the network 140 communication protocol utilized by the merchant beacon device 120.

In block 340, the merchant beacon device 120 broadcasts the beacon identifier code via a wireless communication at the merchant location. For example, the merchant beacon device 120 may broadcast, emit, or otherwise transmit data comprising the beacon identifier via Wi-Fi, Bluetooth, Bluetooth low energy ("BLE"), near field communication ("NFC"), or other appropriate communication protocol to one or more user computing devices 110 located within a threshold proximity to the merchant beacon device 120 at the merchant location. In some example embodiments, before transmitting the merchant beacon identifier, the merchant beacon device 120 is operable to establish a network 140 connection between the merchant beacon device 120 and one or more user computing devices 110 located within a threshold proximity to the merchant beacon device 120 at the merchant location.

In block 350, a merchant system operator installs the merchant POS device 130 at the merchant location to correspond to the merchant beacon device 120. In an example embodiment, both a merchant camera device and a merchant beacon device 120 are installed in proximity to a particular merchant POS device 130. In another example embodiment, a merchant POS device 130 and a merchant beacon device 120 are installed in proximity to two or more particular merchant POS devices 130. In an example embodiment, the merchant POS device 130 is oriented to be able to capture video and/or images of a face of a user 101 standing in front of one or more merchant POS devices 130 during the process of checkout. In an example embodiment, the merchant system installs a merchant POS device 130 that is oriented to capture video and/or images of the face of a user standing in front of a particular merchant POS device 130. In another example embodiment, the merchant system installs a merchant POS device 130 that is oriented to capture video and/or images of the faces of one or more users 101 standing within a proximity of a particular plurality of merchant POS devices 130 within a range of a field of vision of the camera 147 of the merchant POS device 130.

In block 360, the account management system 160 receives a merchant POS device 130 identifier and associates it with the corresponding beacon identifier code of the merchant beacon device 120. In an example embodiment, the merchant system and/or the account management system 160 configures the merchant POS device 130 so that the merchant POS device 130 is able to communicate with the account management system 160 over the network 140. An example camera device 140 identifier comprises a hardware identifier, a MAC address, or other useful or relevant identifier associated with the merchant POS device 130. In an example embodiment, the account management system 160 comprises a database that lists merchant POS device 130 identifiers and associated beacon identifiers for merchant beacon device 120 identifiers for a particular merchant location. In an example embodiment, the merchant POS device 130 transmits the merchant beacon device 120 identifier and the merchant POS device 130 identifier to the account management system 160. In an example embodiment, during the setup and installation process, the merchant POS device 130 receives the merchant beacon device 120 identifier over an appropriate wireless communication channel from the merchant beacon device 120. In another example embodiment, during the setup and installation process, the merchant POS device 130 establishes a network 140 connection with the merchant beacon device 120 and receives the merchant beacon device 120 identifier over the network 140. In another example embodiment, the account management system 160 receives the merchant POS device 130 identifier, extracts one or more merchant beacon device 120 identifiers from the database, and associates the merchant POS device 130 identifier with one or more of the one or more extracted merchant beacon device 120 identifiers. In yet another example embodiment, the merchant system operator installs the one or more merchant beacon devices 120 after installing the one or more merchant camera devices 140. In this example embodiment, the account management system 160 generates a merchant beacon device identifier to associate with a merchant POS device 130 identifier and transmits the generated merchant beacon device 120 identifier to the merchant system. In this example embodiment, the merchant system operator manually configures the merchant beacon device 120 to broadcast, emit, or otherwise transmit the merchant beacon device identifier assigned by the account management system 160 over a network 140.

In certain example embodiments, one or both of the merchant POS device 130 and the merchant beacon device 120 are components of the merchant POS device 130 or are wirelessly or physically connected to the merchant POS device 130 and controlled by one or more processors of the merchant POS device 130. In certain example embodiments, certain functions described herein as performed by the merchant POS device 130 and/or the merchant beacon device 120 may also be performed by the merchant POS device 130.

From block 360, the method 210 proceeds to block 220 of FIG. 2.

Returning to FIG. 2, in block 220, the user 101 registers with the account management system 160. The method for registering for an account with an account management system 160 is described in more detail hereinafter with reference to the method 220 described in FIG. 4.

Figure 4:
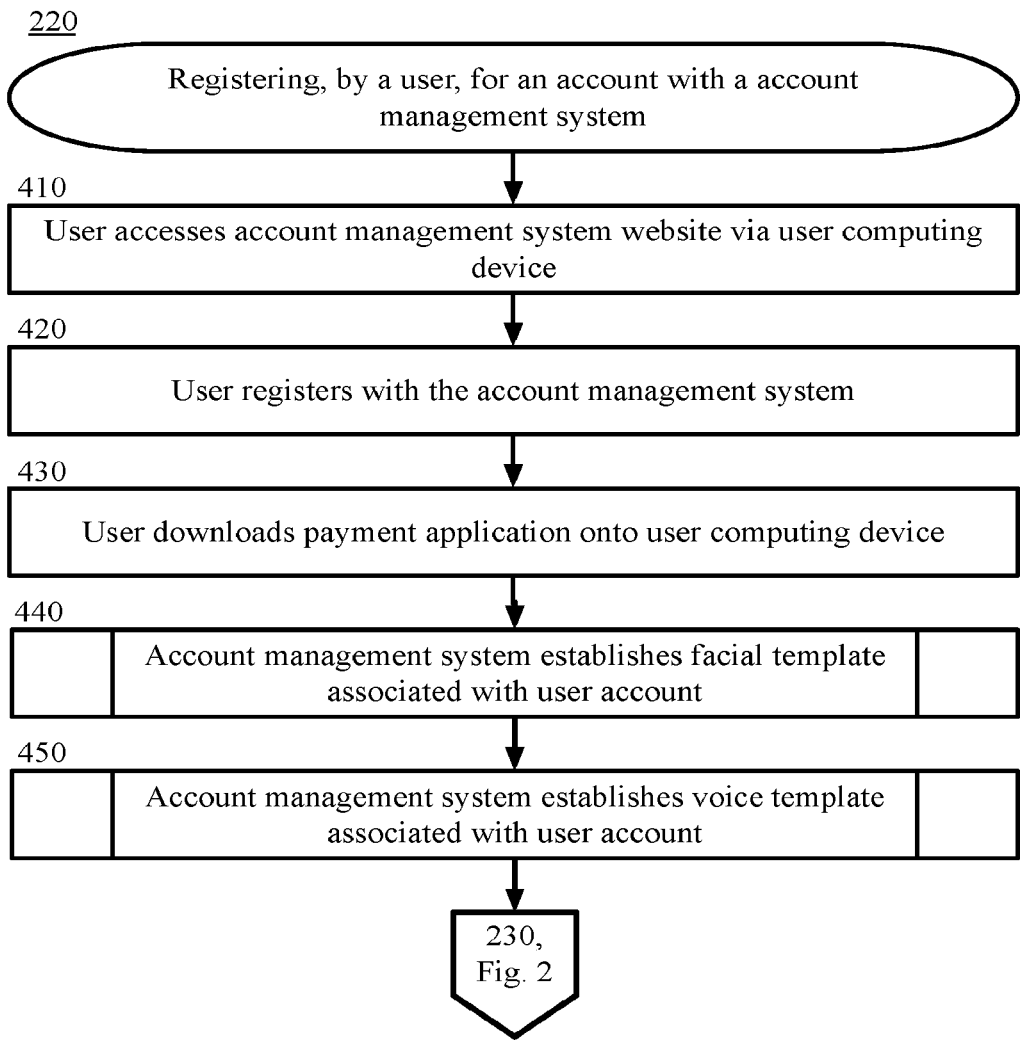
FIG. 4 is a block flow diagram depicting a method for registering, by a user, for an account with an account management system, in accordance with certain example embodiments.

FIG. 4 is a block diagram depicting a method 220 for registering, by a user 101, for an account with an account management system 160, in accordance with certain example embodiments. The method 220 is described with reference to the components illustrated in FIG. 1.

In block 410, the user 101 accesses the account management system website 169. For example, the user 101 accesses the account management system 160 via the web browser 118 of the user computing device 110. In another example, the user 101 may otherwise contact the account management system 160 to register for a user 101 account.

In block 420, the user 101 registers with the account management system 160. The user 101 may obtain a user account number, receive the appropriate applications and software to install on the user computing device 110, request authorization to participate in hands-free payment processing, or perform any action requested by the account management system 160. The user 101 may utilize the functions of the user computing device 110, such as the user interface 115 and the web browser 118, to register and configure a user 101 account. In an example embodiment, the user 101 enters user account information into the user account via the user computing device 110. Example user account information comprises payment account information associated with one or more user 101 accounts, for example, one or more credit accounts, one or more bank accounts, one or more stored value accounts, and/or other appropriate accounts. Example user account information may also comprise user 101 contact information such as a user 101 residential address, commercial address, business address, telephone number, email address, or other appropriate contact information. Example user 101 account information may also comprise demographic information of the user 101 such as an age of the user, membership status of the user 101 in rewards programs or clubs, or other relevant demographic information of the user 101. Further, example user account information comprises a user facial template or audio template as described in the example embodiments herein. Further, example user 101 account information comprises an option to enable or disable a permission of the account management system 160 to process hands free transactions as described in the example embodiments herein.

In block 430, the user 101 downloads the application 113 onto the user computing device 110. In an example embodiment, the application 113 operating on the user computing device 110 is able to communicate with the account management system 160 over the network 140. In an example embodiment, the user 101 configures the user 101 account settings or add, delete, or edit user account information via the application 113. In an example embodiment, the user 101 selects an option to enable or disable the permission of the account management system 160 to process hands free transactions. For example, a hands free transaction comprises a transaction wherein the user 101 does not need to interact with the user computing device 110 or that requires minimal user 101 interaction with the user computing device 110 to initiate a transaction with the merchant system.

In block 440, the account management system 160 establishes a facial template associated with the user 101 account. The method for establishing a facial template associated with a user 101 account is described in more detail hereinafter with reference to the method 440 described in FIG. 5.

Figure 5:
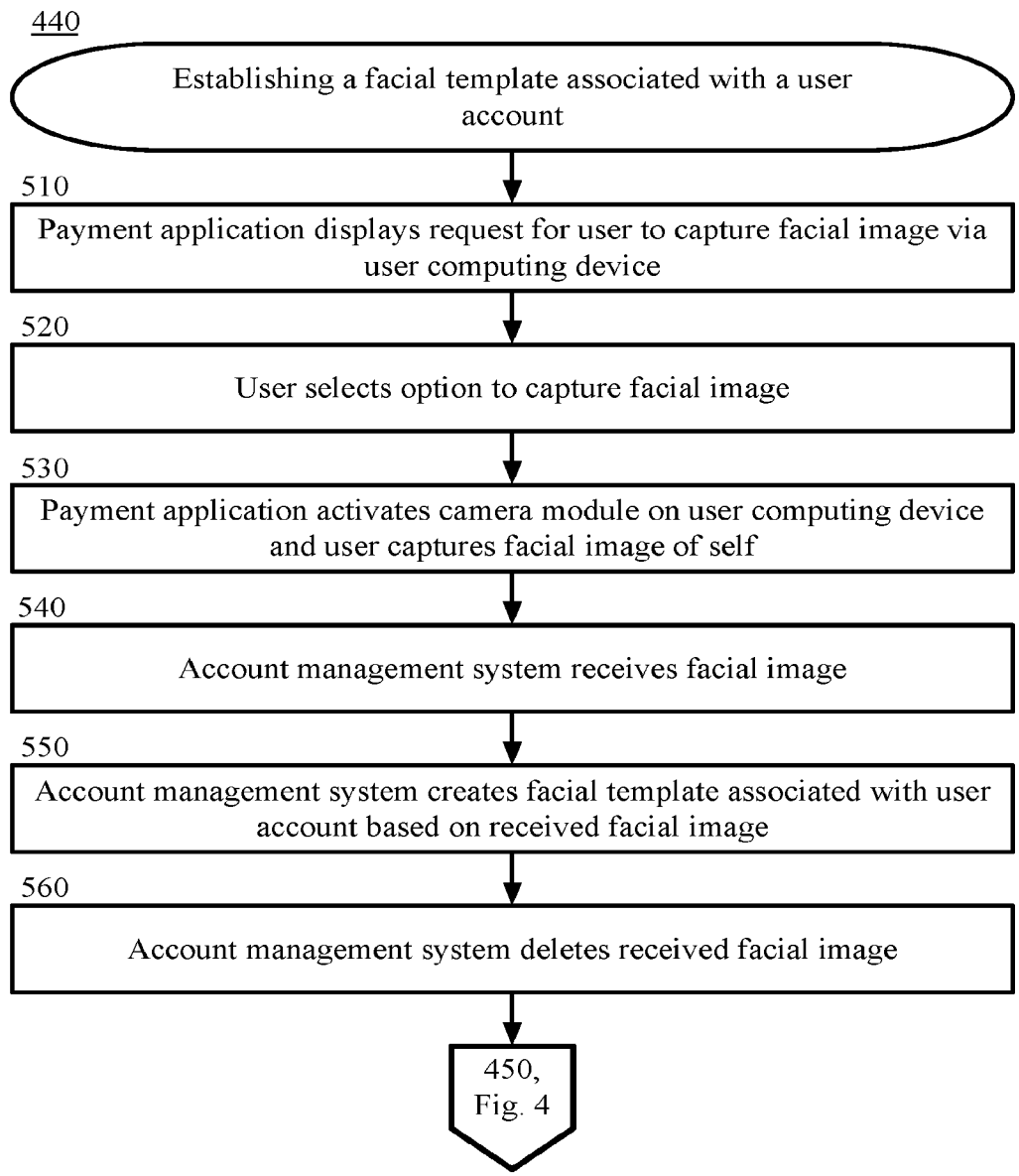
FIG. 5 is a block flow diagram depicting a method for establishing a facial template associated with a user account, in accordance with certain example embodiments.

FIG. 5 is a block diagram depicting a method 440 for establishing a facial template associated with a user 101 account, in accordance with certain example embodiments. The method 440 is described with reference to the components illustrated in FIG. 1.

In block 510, the application 113 displays a request for the user 101 to capture a facial image via the user computing device 110. In an example embodiment, the application 113 displays the request via the user interface 115. In an example, the user interface 115 may display a request that reads, "to enable hands free transactions, we need an image of your face. Would you like submit a facial image now?" In this example, the user 101 selects an option to take a current picture or otherwise selects a picture stored on the user computing device 110.

In block 520, the user 101 selects an option to capture a facial image. For example, the user 101 actuates an object on the user interface 115 that reads, "yes, I would like to take a picture now."

In block 530, the application 113 activates the camera 117 on the user computing device 110 and the user 101 captures a facial image of himself In an example embodiment, the user computing device user interface 115 displays a live camera feed of the user 101 to aid the user 101 in aligning the user's 101 face to take the facial image. In an example embodiment, the application 113 displays a box or other perimeter on the user interface 115 within which the user 101 should align his face to take a picture of a required size predetermined by the account management system 160. In an example embodiment, the user 101 actuates an object on the user interface 115 to capture the image. In this example embodiment, in response to the user actuating the object on the user interface 115, the camera 117 receives a command from the application 113 to capture an image of the user 101. In another example embodiment, the camera 117 receives a command from the application 113 to capture a plurality of images of the user 101 as the user 101 moves the camera around the user's 101 face. For example, each of the plurality of images of the user 101 corresponds to a particular pose of the user's 101 face. An example facial image may comprises a digital image of the face of a user 101. In an example embodiment, the account management system 160 establishes guidelines for users 101 in submitting facial images. For example, the application 113 directs the user 101 to remove any hats, head coverings, glasses, or other objects or accessories that may occlude regions of the user's 101 face so that application 160 may receive a complete depiction of the user's 101 face.

In an example embodiment, the user computing device 110 determines if the captured facial image is a valid facial image or an invalid facial image. For example, a valid facial image complies with guidelines predetermined by the account management system 160 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the account management system 160 via the network 140.

In block 540, the account management system 160 receives the facial image. In another example embodiment, the account management system 160 receives a plurality of facial images of the user 101. For example, the application 113 transmits the one or more facial images of the user 101 to the account management system 160 via the network 140. In an example embodiment, the account management system 160 associates the received one or more facial images with the user 101 account. For example, the account management system 160 is able to identify the user 101 account to associate with the received one or more images because the user 101 is currently logged in to the application 113 on the user computing device 110 at the time the one or more facial images are transmitted to the account management system 160. In certain example embodiments, the account management system 160 determines if the received facial image is a valid facial image or an invalid facial image. For example, a valid facial image complies with all guidelines predetermined by the account management system 160 and an invalid facial image does not comply with one or more of the guidelines. For example, if a user 101 submits a facial image that comprises incorrect dimensions, if part or all of the user's 101 face is occluded, or if the image is too dark or too bright, the account management system 160 rejects the invalid facial image and transmits a request to the user computing device 110 directing the user 101 to capture a subsequent facial image to transmit to the account management system 160. In this example, the user computing device 110 receives and displays the request. The user 101 captures a subsequent facial image via the user computing device 110 and transmits the subsequent facial image to the account management system 160 via the network 140. In another example, the user 101 submits a facial image that is not of a face. The account management system 160 or application 113 determines, via facial recognition, that the image is not of a face, the account management system 160 or application 113 rejects the invalid facial image, and transmits a request to the user computing device 110 for display by the user computing device 110 directing the user 101 capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 140. In yet another example, the user 101 submits a facial image that is of a face, but the account management system 160 or application 113 determines that the image, based on one or more image metrics such as image resolution, is not of a minimum quality standard. The account management system 160 or application 113 rejects the invalid facial image and transmits a request to the user computing device 110 for display by the user computing device 110 directing the user 101 capture a subsequent facial image to transmit to the account management system 160. In this example, the user computing device 110 receives and displays the request. The user 101 captures a subsequent facial image via the user computing device 110, and the user computing device 110 transmits the subsequent facial image to the account management system 160 via the network 140.

In block 550, the account management system 160 creates a facial template associated with the user 101 account based on the received facial image. In another example embodiment, the account management system 160 generates a corresponding facial template for each of a plurality of received facial images associated with the user 101 account. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network.

In an example embodiment, the account management system 160 stores the generated facial template associated with the user 101 in a data storage unit 166 associated with the account management system 160. For example, the account management system 160 database comprises a table or other means by which it correlates each user 101 account identifier with an associated facial template of the user 101.

In another example embodiment, after the user computing device 110 captures one or more facial images of the user 101, the user computing device 110 generates one or more facial templates corresponding to one or more of the one or more captured facial images of the user 101. In this example embodiment, the user computing device 110 transmits the one or more generated facial templates to the account management system 160 over the network 140.

In block 560, the account management system 160 deletes the received facial image. For example, the account management system 160 only uses a facial template comprising a computer code representation of the facial image of the user 101. In another example, the account management system 160 saves the received facial image for future processing. For example, the account management system 160, at a later time, updates a facial template generation algorithm and generates an updated facial template corresponding to the saved facial image.

From block 560, the method 440 proceeds to block 450 in FIG. 4.

Returning to block 450, in FIG. 4, the account management system 160 establishes an audio template associated with the user 101 account. The method for establishing an audio template associated with a user 101 account is described in more detail hereinafter with reference to the method 450 described in FIG. 6.

Figure 6:
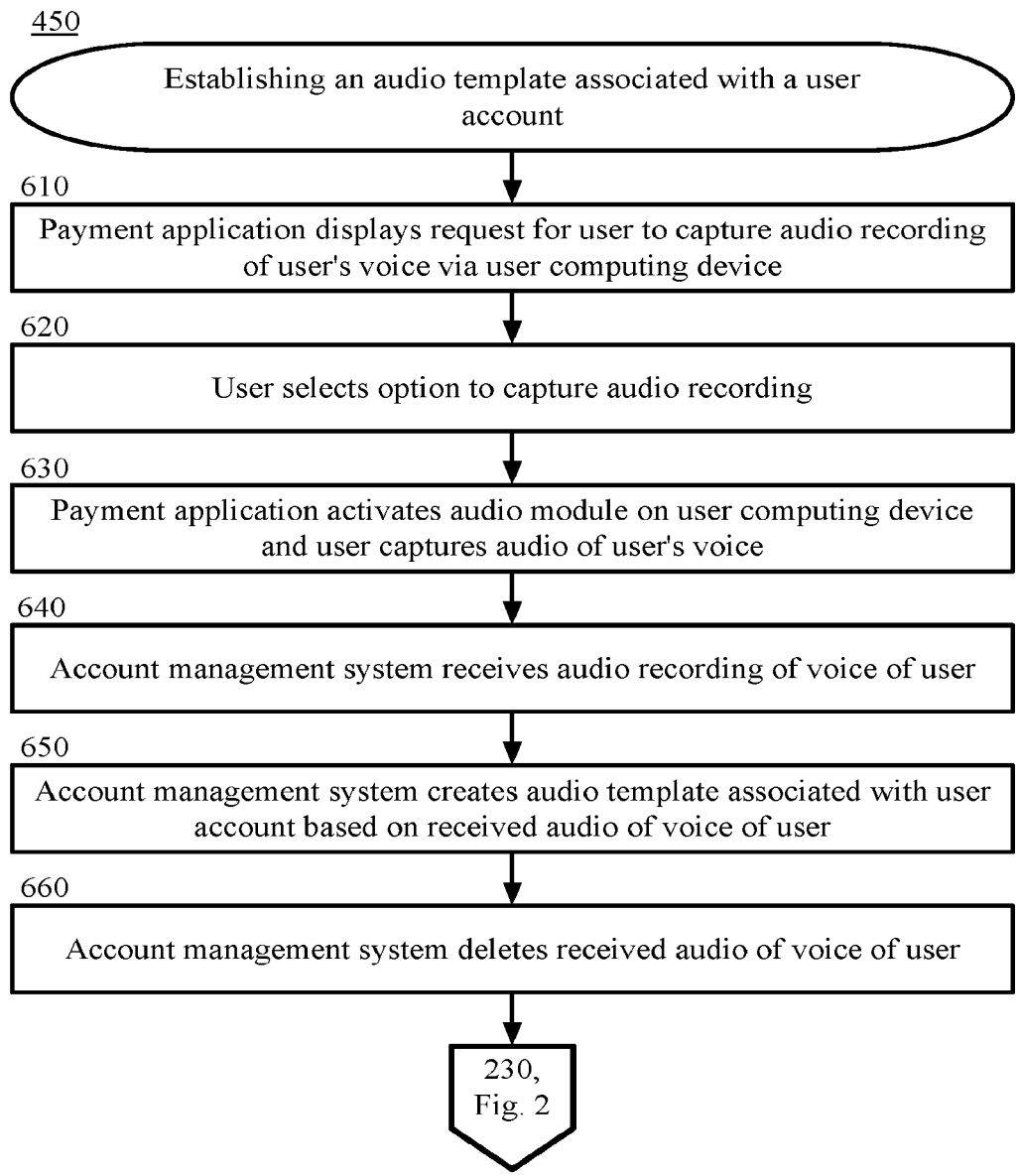
FIG. 6 is a block flow diagram depicting a method for establishing an audio template associated with a user account, in accordance with certain example embodiments.

FIG. 6 is a block diagram depicting a method 450 for establishing an audio template associated with a user 101 account, in accordance with certain example embodiments. The method 450 is described with reference to the components illustrated in FIG. 1.

In block 610, the application 113 displays a request for the user 101 to capture an audio recording of the user's 101 voice via the user computing device 110. In an example embodiment, the application 113 displays the request via the user interface 115. In an example, the user interface 115 may display a request that reads, "to enable hands free transactions, we need recording of your voice. Would you like submit an audio recording now?" In this example, the user 101 selects an option to submit a live audio recording or otherwise selects a pre-recorded audio recording of the user 101 stored on the user computing device 110.

In block 620, the user 101 selects an option to capture an audio recording. For example, the user 101 actuates an object on the user interface 115 that reads, "yes, I would like to submit a audio recording now."

In block 630, the application 113 activates an audio module (not depicted) on the user computing device 110 and the user 101 captures an audio of the user's 101 voice. In an example embodiment, the user computing device user interface 115 may display guidelines received from the account management system 160 to aid the user 101 in submitting an audio recording. For example, the application 113 may display directions for the user 101 to record the user's 101 voice saying the user's 101 name. In another example, the application 113 directs the user 101 to capture an audio recording to establish a voice password that can be used in hands-free transactions of the user 101. In an example embodiment, the user 101 may actuate an object on the user interface 115 to capture or record a live audio recording. In this example embodiment, in response to the user actuating the object on the user interface 115, the audio module receives a command from the application 113 to capture an audio recording of the user 101. In an example embodiment, the account management system 160 establishes guidelines for users 101 in submitting audio recordings. For example, the application 113 directs the user 101 to submit an audio recording no longer than a predefined maximum length of duration. For example, the audio recording must be no longer than five seconds. In another example, the application 113 directs the user 101 submit an audio recording lasting a predefined length of time, for example, an audio recording lasting five seconds. In an example embodiment, after the user 101 initiates an audio recording by actuating an object of the user interface 115, the application 113 transmits a command to the audio module to stop recording the user's 101 voice after the predefined length of time or predefined maximum length of time has expired.

In block 640, the account management system 160 receives an audio recording of the voice of the user 101. For example, the application 113 or audio module transmits the audio recording to the account management system 160 over the network 140. In another example, the application 113 retrieves an audio recording selected by the user 101 and saved in the data storage unit 116 and transmits the retrieved audio recording to the account management system 160 over the network 140.

In block 650, the account management system 160 creates an audio template associated with the user's 101 voice based on the received audio of the voice of the user. In an example, the audio template is of a predetermined size. In an example, the account management system 160 generates an audio template comprising a computer code representation of the user's 101 audio recording. For example, the audio template may describe key features of the audio recording of the user 101, such as the intonation of the user's 101 voice or other features of the user's 101 voice. Example features of a user's voice comprise a volume, a pitch, and/or other features of the user's 101 voice.

In an example embodiment, the account management system 160 stores the generated audio template associated with the user 101 in a data storage unit 166 associated with the account management system 160. For example, the account management system 160 database comprises a table or other means by which it correlates each user 101 account identifier with an associated audio template of the user 101.

In block 660, the account management system 160 deletes the received audio of the voice of the user 101. In an example embodiment, the account management system 160 deletes the received audio recording of the user 101 to protect the privacy of the user 101. For example, the account management system 160 only uses an audio template comprising a computer code representation of the audio recording of the user 101.

From block 660, the method 440 proceeds to block 230 in FIG. 2.

Returning to block 230, in FIG. 2, the user device receives a merchant beacon device 120 identifier. The method for receiving a merchant beacon identifier broadcast by a merchant beacon device 120 is described in more detail hereinafter with reference to the method 240 described in FIG. 7.

Figure 7:
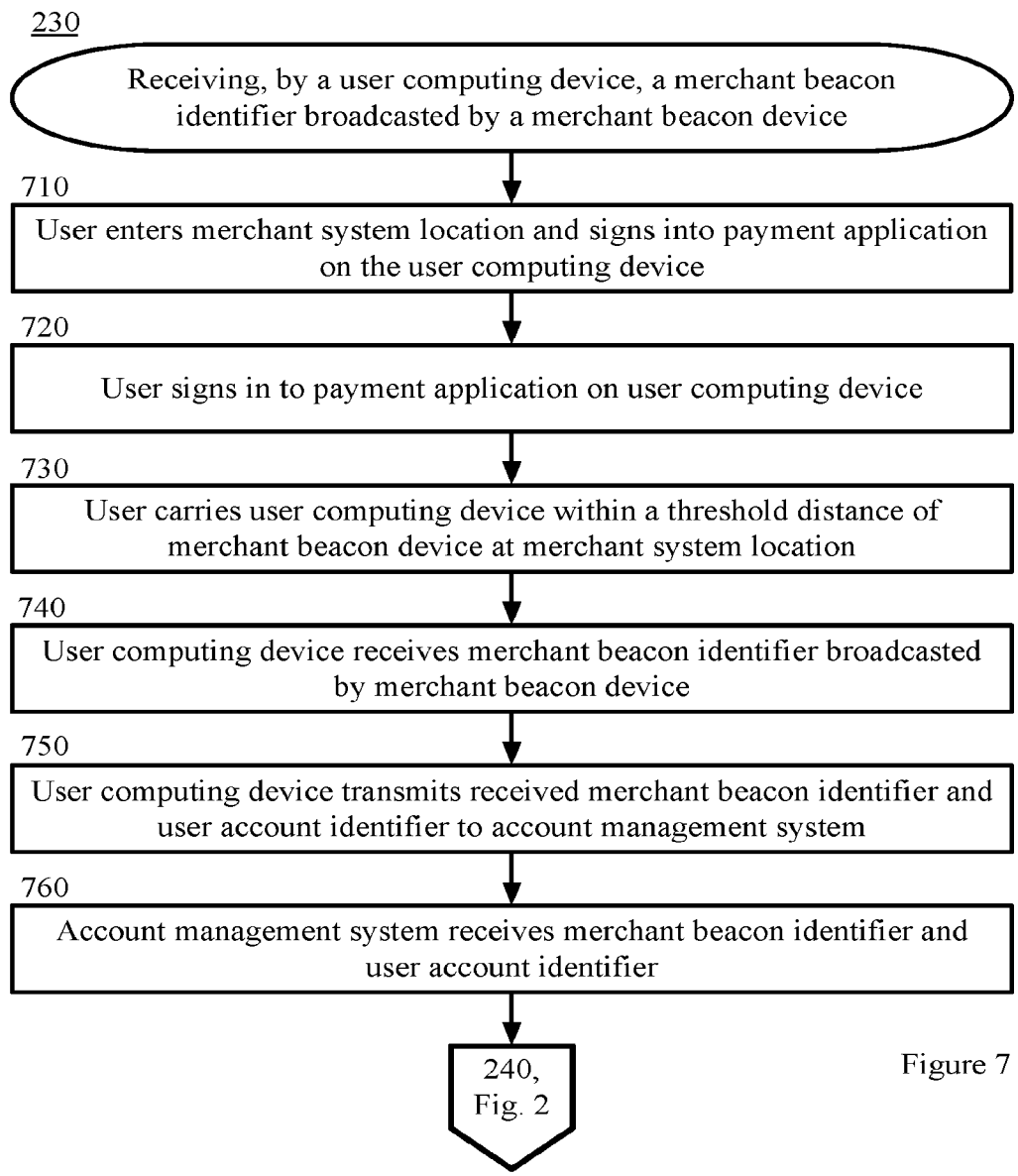
FIG. 7 is a block flow diagram depicting a method for receiving, by a user computing device, a merchant beacon identifier broadcasted by a merchant beacon device, in accordance with certain example embodiments.

FIG. 7 is a block diagram depicting a method 240 for receiving, by a user computing device 110, a merchant beacon identifier broadcast by a merchant beacon device 120, in accordance with certain example embodiments. The method 240 is described with reference to the components illustrated in FIG. 1.

In block 710, the user 101 enters the merchant location and signs into the application 113 on the user computing device 110. In another example embodiment, the user 101 signs into the application 113 at a time before entering the merchant location and enters the merchant location carrying the user computing device 110 signed into the application 113.

In block 720, the user 101 signs in to the application 113 on the user computing device 110. In an example embodiment, the user 101 has a username and password associated with the user 101 account maintained by the account management system 160. In an example embodiment, the user 101 opens the application 113 on the user computing device 110 and enters a username and/or password via the user interface 115 to sign in to the application 113. In an example embodiment, when the user 101 is signed in to the application 113, the application is able to communicate with the account management system 160 over the network 140. In this example embodiment, when the user 101 is not signed in to the application 113, the application does not communicate with the account management system 160 even if the a network 140 connection is available. In an example embodiment, the user 101 may sign out of the application 113 at any time by actuating one or more objects on the user interface 115 of the user computing device 110. In an example embodiment, after signing in to the application 113, the user 101 configures one or more user 101 account settings, add, edit, or delete user 101 payment account information, and/or change user 101 preferences. In certain example embodiments, a user 101 may be required to make a feature selection to obtain the benefits of the techniques described herein. For example, the user 101 may have to enable one or more user 101 account settings to enable hands free transactions according to the methods described herein.

In an example embodiment, application 113 provides options, data, configurable alerts, and other suitable features to the user 101. For example, the application 113 comprises a listing of merchant systems and merchant locations that participate in hands free payment transactions according to one or more of the methods described herein. The listing may be updated periodically from the account management system 160. The application 113 may notify the user 101 when the user 101 is within a configured vicinity of a participating merchant system. The application 113 may provide the user 101 with options to update payment preferences. The application 113 may provide the user 101 with a listing of recent transactions. The application 113 may provide any other suitable information to the user 101.

In block 730, the user 101 carries the user computing device 110 within a threshold distance of the merchant beacon device 120 at the merchant location. In an example embodiment, the user 101 enters the merchant location carrying the user computing device 110 in a pocket or a bag, in the hands of the user 101, or in any suitable manner. The location of the merchant system may be a store location, a kiosk location, or any suitable physical location of a merchant system. In another example embodiment, a merchant POS operator 102 may be mobile and arrive at a location of the user 101. For example, the merchant system may be a restaurant and the merchant POS device operator 102 may be a delivery person possessing a portable merchant POS device 130.

In certain example embodiments, the application 113 alerts the user 101 when the user 101 is in the vicinity of a merchant location that accepts hands-free payments. The alert may be provided via a message on the user computing device 110, via an email or a text, or in any suitable manner. In an example embodiment, the alert is based on the location of the user 101 as determined by a GPS component (not depicted) resident on the user computing device 110. For example, the application 113 accesses the GPS data from the GPS component and compare the GPS location to a list of merchant locations that accept hands free payments. For example, the application 113 comprises a list or accesses a list maintained by the account management system 160 of merchant locations that accept hands free payments. If a match results from the comparison, then an alert is generated and provided to the user 101. The match may result if the user 101 is within a configured distance of a qualified merchant location. In an example embodiment, the alerts may be configured to alert in any suitable manner. In an example, the alerts may be combined in commercially dense environments or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 115 of the user computing device 110, or other suitable alert.

In block 740, the user computing device 110 receives a merchant beacon identifier broadcasted by the merchant beacon device 120. The user computing device 110 recognizes a merchant beacon device 120 via wireless communication at the location of the merchant system. The user computing device 110 may be configured to search for beacons or other wireless signals. In an example embodiment, the user computing device 110 and the merchant beacon device 120 establish a BLE wireless network 140 connection. In other example embodiments, the user computing device 110 and the merchant beacon device 120 establish a Bluetooth, Wi-Fi, NFC, or other appropriate network 140 connection. Upon entering the range of the signal of the merchant beacon device 120, the user computing device 110 receives the merchant beacon identifier.

In block 750, the user computing device 110 transmits the received merchant beacon identifier and a user 101 account identifier to the account management system 160. In an example embodiment, the user computing device 110 transmits the data received in the merchant beacon identifier along with a user 101 account identifier to the account management system 160 over the network 140.

In block 760, the account management system 160 receives the merchant beacon identifier and the user 101 account identifier. For example, the account management system 160 receives the merchant beacon identifier and the user 101 account identifier over the network 140. The user computing device 110 may compare data from the merchant beacon identifier to a database of merchant beacon identifier data and merchant camera device identifier data. In an example embodiment, the user computing device 110 compares this data to determine an identity of the merchant system and an identity of the merchant POS device 130 associated with the merchant beacon identifier. In another example embodiment, the user computing device 110 compares this data to verify the authenticity of the beacon.

From block 760, the method 230 proceeds to block 240 in FIG. 2.

Returning to FIG. 2, in block 240, the merchant POS device 130 receives a facial template for each user 101 in range of the merchant beacon device 120. The method for receiving, by a merchant POS device 130, a facial template for each user 101 in range of the merchant beacon device 120 is described in more detail hereinafter with reference to the method 240 described in FIG. 8. In other example embodiments, in addition to or instead receiving the facial template, the merchant POS device 130 receives an audio template and/or a challenge and response associated with the user 101 account.

Figure 8:
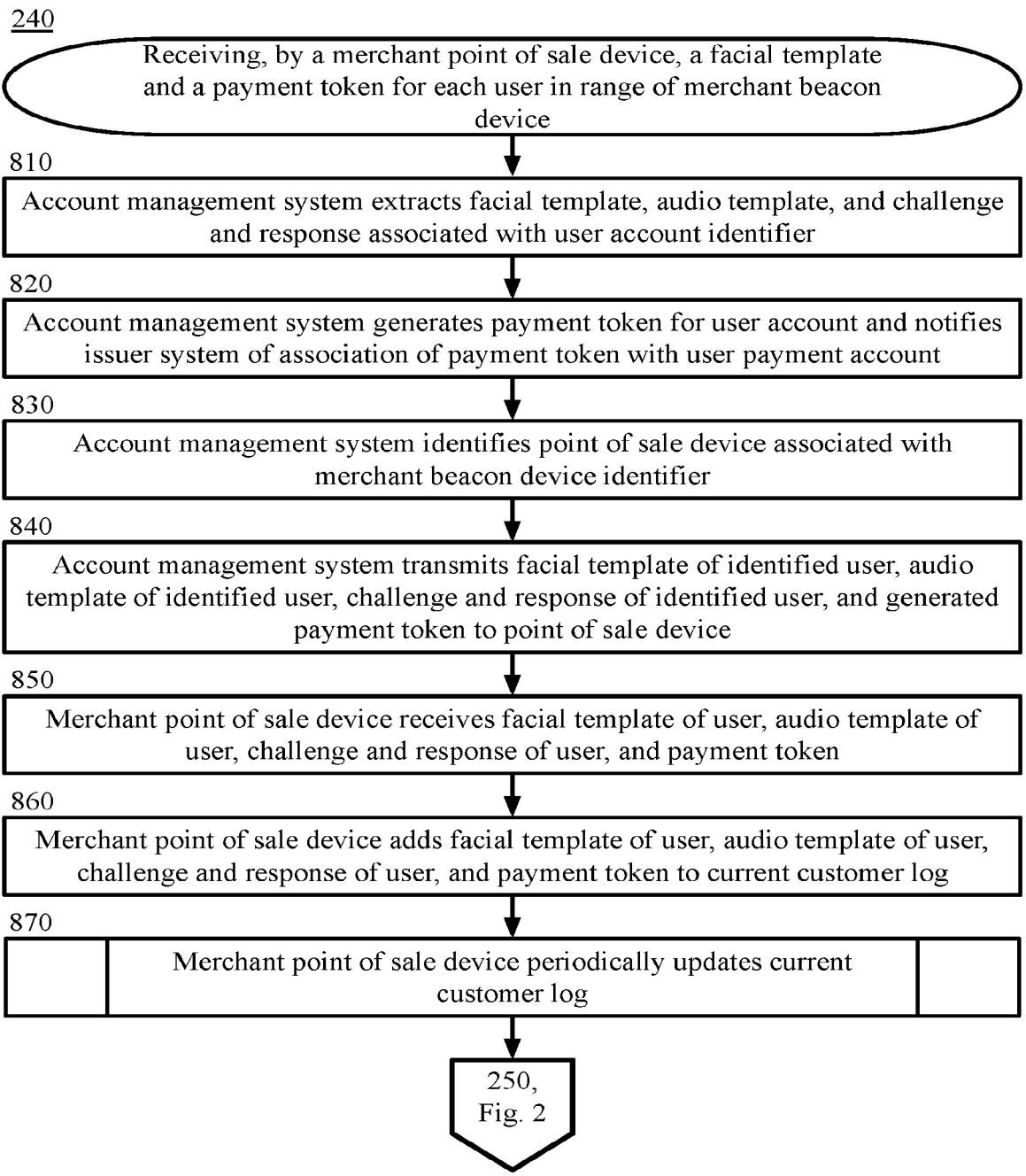
FIG. 8 is a block flow diagram depicting a method for receiving, by a merchant POS device, a facial template and a payment token for each user in range of a merchant beacon device, in accordance with certain example embodiments.

FIG. 8 is a block diagram depicting a method 240 for receiving, by a merchant POS device 130, a facial template for each user 101 in range of the merchant beacon device 120, in accordance with certain example embodiments. The method 240 is described with reference to the components illustrated in FIG. 1. In other example embodiments, in addition to or instead receiving the facial template, the merchant POS device 130 receives an audio template and/or a challenge and response associated with the user 101 account according to a similar method.

In block 810, the account management system 160 extracts a facial template, audio template, and/or challenge and response associated with the user 101 account identifier. In an example embodiment, the account management system 160 accesses a database comprising stored facial templates for a plurality of users 101 with corresponding user 101 account identifiers for each user 101. For example, this database is stored in the data storage unit 166. In another example, the account management system 160 extracts an audio template and/or a challenge and response instead of or in addition to the facial template from the database.

In block 820, the account management system 160 generates a payment token for a user payment account and notifies an issuer system that maintains the payment account of the payment token associated with the payment account. In an example embodiment, the account management system 160 generates a payment token for each user 101 whose user computing device 110 is within network range of the merchant beacon device 120 and is signed in to the application 113. An example payment token comprises a series of alphanumeric and/or symbolic characters. The example payment token may be associated with a payment account of the user 101 and be recognizable by an issuer system 150 associated with the payment account of the user 101. For example, the account management system 160 generates the payment token and communicates the payment token to the issuer system 150 associated with the payment account. In this example, if the issuer system 150 receives the payment token from a POS device 130 in a payment transaction, the issuer system 150 is able to extract the user 101 payment account information associated with the payment token.

In some example embodiments, the account management system 160 places restrictions on payment tokens for security reasons or according to one or more configurations of the user 101 account desired by the user 101. For example, the payment token may only be valid for a preconfigured length of time, for example, one hour. In another example, the payment token may only be valid for us in a transaction between the user 101 and a particular merchant system. In yet another example, the payment token is only valid for use within a particular geographic boundary or within a threshold distance from a geographic point. In an example embodiment, the account management system 160 communicates one or more of these example restrictions to the issuer system 150 and the issuer system 150 associates these one or more restrictions with the payment token and the user 101 payment account data in a database of the issuer system 150. In an example embodiment, the account management system 160 communicates a time stamp representing a time when the payment token was generated to the issuer system 150. In another example embodiment, the account management system 160 communicates location data describing geographic boundaries and/or threshold distances from geographic points where the payment token may be used in a transaction to the issuer system 150. In yet another example embodiment, the account management system 160 communicates a merchant system identifier and instructions that only payment authorization requests originating from merchant systems comprising the merchant system identifier may be approved to the issuer system 150. In an example embodiment, the issuer system 150 associates the payment token, the user 101 payment account data associated with the payment token, the one or more restrictions placed on the payment token by the account management system 160, and/or one or more of location data, time stamp data, merchant system identifier data, or other data that the issuer system 150 may use to determine whether the one or more restrictions on the payment token are satisfied to enable use of the payment token.

In block 830, the account management system 160 identifies a merchant POS device 130 associated with the merchant beacon device 120 identifier. In an example embodiment, the account management system 160 recognizes that the merchant beacon identifier is associated with the account management system 160 and a particular merchant POS device 130 at the merchant location. In an example embodiment, the account management system 160 recognizes that the merchant beacon identifier is associated with a plurality of merchant POS device 130 installed at a merchant location.

In block 840, the account management system 160 transmits the facial template of the identified user 101, the audio template of the identified user 101, and/or the challenge and response associated with the identified user 101, along with the generated payment token to the merchant POS device 130 associated with the merchant beacon device 120 identifier. In another example embodiment, the account management system 160 transmits the facial template of the identified user 101 and the generated payment token to a plurality of merchant POS devices 130 associated with the merchant beacon device 120 identifier. In certain example embodiments, the account management system 160 receives, in real time or near real time, a plurality of transmissions from a plurality of user computing devices 101 corresponding to a plurality of users 101 present at the merchant location. Each transmission comprises a user 101 account identifier and a retransmitted merchant beacon identifier. In these example embodiments, in response to receiving each such transmission, the account management system 160 retrieves a facial template associated with the received user 101 account identifier and transmits a facial template to one or more merchant POS devices 130 at the merchant location associated with the merchant beacon identifier. In other example embodiments, in addition to or instead transmitting facial template, the account management system 160 transmits an audio template and/or a challenge and response associated with the user 101 account to one or more merchant POS devices 130.

In block 850, the merchant POS device 130 receives the facial template of the user 101. In another example, in addition to or instead receiving the facial template, the merchant POS device 130 receives an audio template and/or a challenge and response associated with the user 101 account. In another example embodiment, a plurality of merchant POS devices 130 receives the facial template of the user 101. In yet another example embodiment, the merchant POS devices and/or the plurality of merchant POS devices 130 receives one or more additional facial templates, audio templates, and/or challenges and responses from the account management system 160 corresponding to one or more users 101 other than the instant user 101 having user computing devices 110 in network 140 connection to a merchant beacon device 120 according to the method previously described herein. For example, the one or more additional facial templates, audio templates, and/or challenges and associated responses are received in real time from the account management system 160 as additional users 101 other than the instant user 101 receive the merchant beacon device 120 identifier over a wireless communication network 140 or otherwise establish a network 140 connection between their user computing devices 110 and one or more merchant beacon devices 120. For example, the one or more merchant POS devices 130 may receive one or more additional facial templates, audio templates, and/or challenges and responses corresponding to one or more additional users 101 at a time before, at the same time, or after the time at which the merchant POS devices 130 receives the facial template of the instant user 101.

In block 860, the merchant POS device 130 adds the facial template of the user 101 to a customer log. In an example, the merchant POS device 130 adds, in addition to or instead of the facial template of the user 101, an audio template and/or a challenge and response associated with the user 101 to the customer log. In an example embodiment, the customer log is accessible by the merchant POS device 130 and by the account management system 160. In an example embodiment, the merchant POS device 130 maintains the customer log on the merchant POS device 130 or on a computing device logically connected to the merchant POS device 130. In another example embodiment, the account management system 160 adds the facial template of the user 101 to the customer log. In this example embodiment, the account management system 160 maintains the customer log in a database or storage device of the account management system 160.

In block 870, the merchant POS device 130 periodically updates the customer log. The method for updating a customer log as users 101 enter or leave a network range of a merchant beacon device 120 is described in more detail hereinafter with reference to the method 870 described in FIG. 9.

Figure 9:
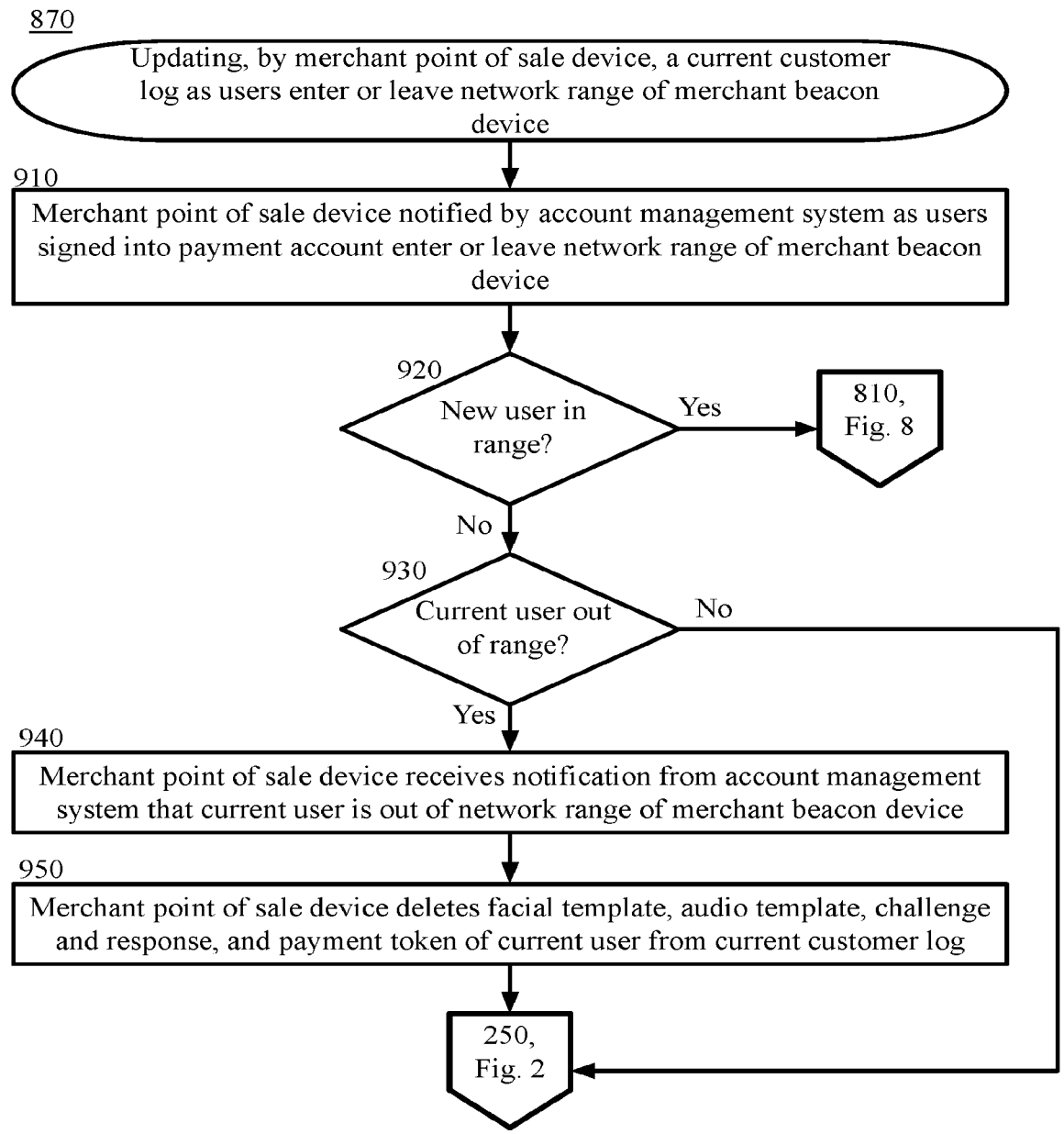
FIG. 9 is a block flow diagram depicting a method for updating, by a merchant POS device, a customer log as users enter or leave a network range of a merchant beacon device, in accordance with certain example embodiments.

FIG. 9 is a block diagram depicting a method 870 for receiving, by a merchant POS device 130, notification from an account management system 160 as users 101 enter or leave a network range of a merchant beacon device 120, in accordance with certain example embodiments. The method 870 is described with reference to the components illustrated in FIG. 1.

In block 910, the merchant POS device 130 is notified by the account management system 160 as users 101 signed into a payment account enter or leave a network range of the merchant beacon device 120. For example, as previously discussed, when a user 101 carrying a user computing device 110 enters a threshold distance from a merchant beacon device 120, the merchant beacon device 120 or the user computing device 110 of the user 101 are able to detect the other device and establish a wireless network 140 connection between the two devices at the merchant location. In this example, the merchant beacon device 120 transmits the merchant beacon identifier corresponding to the merchant beacon device 120 over the local wireless network 140 to the user computing device 110. For example, the merchant beacon device 120 transmits the merchant beacon identifier to the user computing device 110 via a BLE, Bluetooth, Wi-Fi, or NFC wireless communication network 140. In this example, the user computing device 110 retransmits the received merchant beacon identifier to the account management system 160 along with a user 101 account identifier identifying the user 101.

In block 920, the account management system 160 determines whether a new user 101 is in range of the merchant beacon device 120. For example, if the account management system 160 receives a new user 101 account identifier in addition to the same merchant beacon identifier, the account management system 160 may determine that a new user 101 is in range of the merchant beacon device 120. In this example, the account management system 160 may infer that the new user 101 has entered the merchant location based on receipt of the new user 101 account identifier. In another example, if the account management system 160 does not receive any new user 101 account identifiers along with the same merchant beacon identifier within a threshold length of time, the account management system 160 may determine that no new users 101 have entered the network 140 range of the merchant beacon device 120.

If a new user 101 is in range of the merchant beacon device 120, the method 870 proceeds to block 810 in FIG. 8. For example, the account management system 160 receives a new user 101 account identifier in addition to the same merchant beacon identifier. In this example, the account management system 160 infers that the new user 101 has entered the merchant location based on receipt of the new user 101 account identifier and the same merchant beacon identifier as previously received from the first user 101.

Returning to FIG. 8, according to the methods previously discussed, in block 810, the account management system 160 extracts a facial template associated with the new user 101 account identifier. In another example, the account management system 160, in addition to or instead of the facial template associated with the new user 101, the account management system 160 extracts an audio template and/or a challenge and response associated with the new user 101. In an example embodiment, the account management system 160 transmits the facial template, audio template, and/or challenge and response to the one or more merchant POS devices 130. The one or more merchant POS devices 130 adds the new user's 101 facial template, audio template, and/or challenge and response to the customer log according to the example method previously described in method 250 in FIG. 8.

Returning to FIG. 9, in block 920, if there is a not a new user 101 in range of the merchant beacon device 120, the method 870 proceeds to block 930. For example, the account management system 160 does not receive any new user 101 account identifiers along with the same merchant beacon identifier within a threshold length of time and determines that no new users 101 have entered the network 140 range of the merchant beacon device 120.

In block 930, the merchant POS device 130 determines whether a current user 101 has moved out of range of the merchant beacon device 120. In an example embodiment, the user computing device 110 continues to receive the merchant beacon identifier from the merchant beacon device 120, and retransmits the merchant beacon identifier along with the user 101 account identifier to the account management system 160. In this example embodiment, the user computing device 110 periodically transmits information comprising the merchant beacon identifier and user 101 account identifier to the account management system 160, as long as the user computing device 110 continues to detect the merchant beacon device 120 and/or receives the merchant beacon device 120 identifier via periodic scans. For example, the user computing device scans for the merchant beacon device 120 every five seconds. In another example embodiment, the user computing device 110 periodically transmits information comprising the merchant beacon identifier and user 101 account identifier to the account management system 160, as long as the user computing device 110 maintains a wireless network 140 connection with the merchant beacon device 120. For example, the user computing device 110 transmits this information to the account management system 160 at every five seconds. In this example embodiment, if the account management system 160 ceases to receive the information from the user computing device for a predefined number of intervals, the account management system 160 may determine that the corresponding user 101 has moved out of range of the merchant beacon device. In this example embodiment, if the account management system 160 continues to receive the information transmitted by the user computing device 110 at the expected intervals, the account management system 160 determines that the user 101 is still in network 140 range of the merchant beacon device 120.

If no current user 101 has moved out of range of the merchant beacon device 120, the method 870 proceeds to block 250 in FIG. 2. For example, the account management system 160 continues to receive the merchant beacon identifier and user 101 account identifier transmitted by the user computing device 110 at the expected intervals and determines that the user 101 is still in network 140 range of the merchant beacon device 120.

Returning to FIG. 9, in block 930, if a current user 101 has moved out of range of the merchant beacon device 120, the method 870 proceeds to block 940.

In block 940, the merchant POS device 130 receives a notification from the account management system 160 that a current user 101 is out of network range of the merchant beacon device 120. In another example embodiment, the merchant POS device 130 receives a notification from the account management system 160 that the user computing device 110 associated with the current user 101 has stopped sending notifications to the account management system 160 comprising the merchant beacon device 120 identifier. For example, the merchant POS device 130 receives the user 101 account identifier for the current user 101 associated with a user computing device 110 that is either out of network range or has stopped transmitting notifications comprising the merchant beacon device 120 identifier to the account management system 160. The merchant POS device 130 accesses the customer log and finds an entry corresponding to the current user 101. For example, the customer log is maintained by the account management system 160 and the merchant POS device 130 accesses the customer log over the network 140 by communicating with the account management system 160. In another example embodiment, the account management system 160 does not transmit a notification to the merchant POS device 130 that the current user 101 is out of network range. In this example embodiment, the account management system 160 accesses the customer log and deletes the facial template of the current user 101 from the customer log. In another example embodiment, in addition to deleting the facial template of the current user 101 from the customer log, the merchant POS device 130 deletes the audio template and/or the challenge and response associated with the current user 101 from the customer log.

In block 950, the merchant POS device 130 deletes the facial template of the current user 101 from the customer log. For example, the customer log comprises a table, and the merchant POS device 130 deletes or requests the deletion of an entry or row corresponding to data associated with the current user 101 for which the POS device 130 received the notification. In another example, the merchant POS device 130 deletes the associated audio template and/or associated challenge and response of the current user 101 from the customer log, in addition to the facial template of the current user 101. In another example embodiment, the account management system 160 accesses the customer log and deletes the facial template, audio template, and/or challenge and response of the current user 101 from the customer log.

From block 950, the method 870 proceeds to block 250, in FIG. 2.

Returning to FIG. 2, in block 250, the user 101 initiates a transaction at the merchant POS device 130. The method for initiating a transaction at a merchant POS device 130 is described in more detail hereinafter with reference to the method 260 described in FIG. 10. In the example embodiments described herein, the user 101 initiates a "hands free transaction" at the merchant POS device 130. An example hands free transaction does not require any interaction with the user computing device 110 on the part of the user 101. In another example, a hands free transaction requires only minimal interaction with the user computing device 110 by the user 101.

Figure 10:
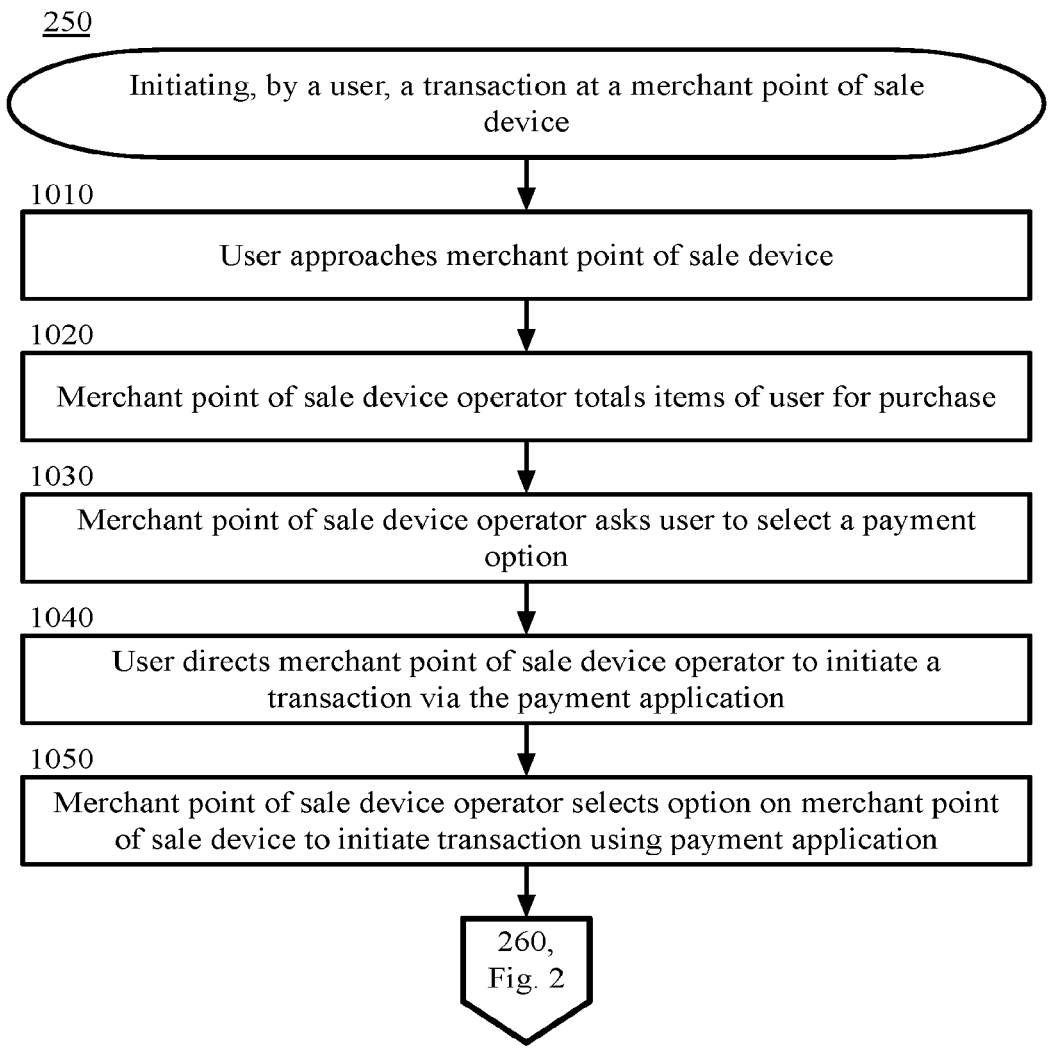
FIG. 10 is a block flow diagram depicting a method for initiating, by a user, a transaction at a merchant POS device, in accordance with certain example embodiments.

FIG. 10 is a block diagram depicting a method 250 for initiating, by a user 101, a transaction at a merchant POS device 130, in accordance with certain example embodiments. The method 250 is described with reference to the components illustrated in FIG. 1.

In block 1010, the user 101 approaches the merchant POS device 130. In an example embodiment, at a time prior to approaching the merchant POS device 130, the user 101 browses the merchant location and selects one or more items to purchase. In this example embodiment, the user 101 may collect the one or more items and carry, or otherwise transport via physical basket or shopping cart, the one or more items to the merchant POS device 130.

In block 1020, the merchant POS device 130 operator 102 totals the items of the user 101 for purchase. In an example embodiment, the merchant POS device operator 102 scans barcodes attached to the one or more items or otherwise enters descriptions and prices associated with the one or more items into the merchant POS device 130. In an example embodiment, after scanning or manually entering the items into the merchant POS device 130, the merchant POS device operator 102 actuates an object on the user interface 135 of the merchant POS device 130 to order the merchant POS device 130 to total the items. In an example embodiment, the merchant POS device 130 displays, via the user interface 135, the total to the user 101.

In block 1030, the merchant POS device 130 operator asks the user 101 to select a payment option. In an example embodiment, the merchant POS device 130 displays one or more payment options that the user 101 may select to use in a transaction. Example payment options comprise payment via a application 113 associated with the account management system 160, payment by cash, payment by check, payment by credit card, payment by debit card, and/or any other means of payment that the merchant system can or is willing to accept for payment from the user 101. In an example embodiment, the one or more payment options are displayed as objects on the user interface 135 and are selectable by the merchant POS device operator 102 in response to the user 101 directing the merchant POS device 102 operator to make a selection.

In block 1040, the user 101 directs the merchant POS device operator 102 to initiate a transaction via the application 113. In an example embodiment, in response to receiving a verbal request from the user 101 to select the application 113 as a payment option, the merchant POS device operator 102 actuates an object on the user interface 135 of the merchant POS device 130 corresponding to the application 113 payment option.

In block 1050, the merchant POS device operator 102 selects an option on the merchant POS device 130 to initiate a transaction using the application 113. In an example embodiment, the merchant POS device 130 displays a confirmation screen after the merchant POS device operator 102 selects an option to initiate a transaction using the application 113. An example confirmation screen may display information summarizing the potential transaction and comprising one or more of a transaction total, a description of the one or more items being purchased by the user 101, and an indication that the user 101 selected the application 113 as the method of payment for the transaction. An example confirmation screen may further display options to confirm the transaction or cancel the transaction. In an example embodiment, the user 101 reviews the confirmation screen, determines that the information displayed on the confirmation screen is correct, determines to continue with the transaction, and directs the merchant POS device operator 102 to select the option to confirm the transaction via the user interface 135.

From block 1050, the method 250 proceeds to block 260 in FIG. 2.

Returning to FIG. 2, in block 260, the merchant POS device 130 identifies the user 101 via facial recognition. The method for identifying a user 101 via facial recognition is described in more detail hereinafter with reference to the method 260 described in FIG. 11. In other example embodiments, the merchant POS device 130 identifies the user 101 via audio recognition and/or via a challenge and response.

Figure 11:
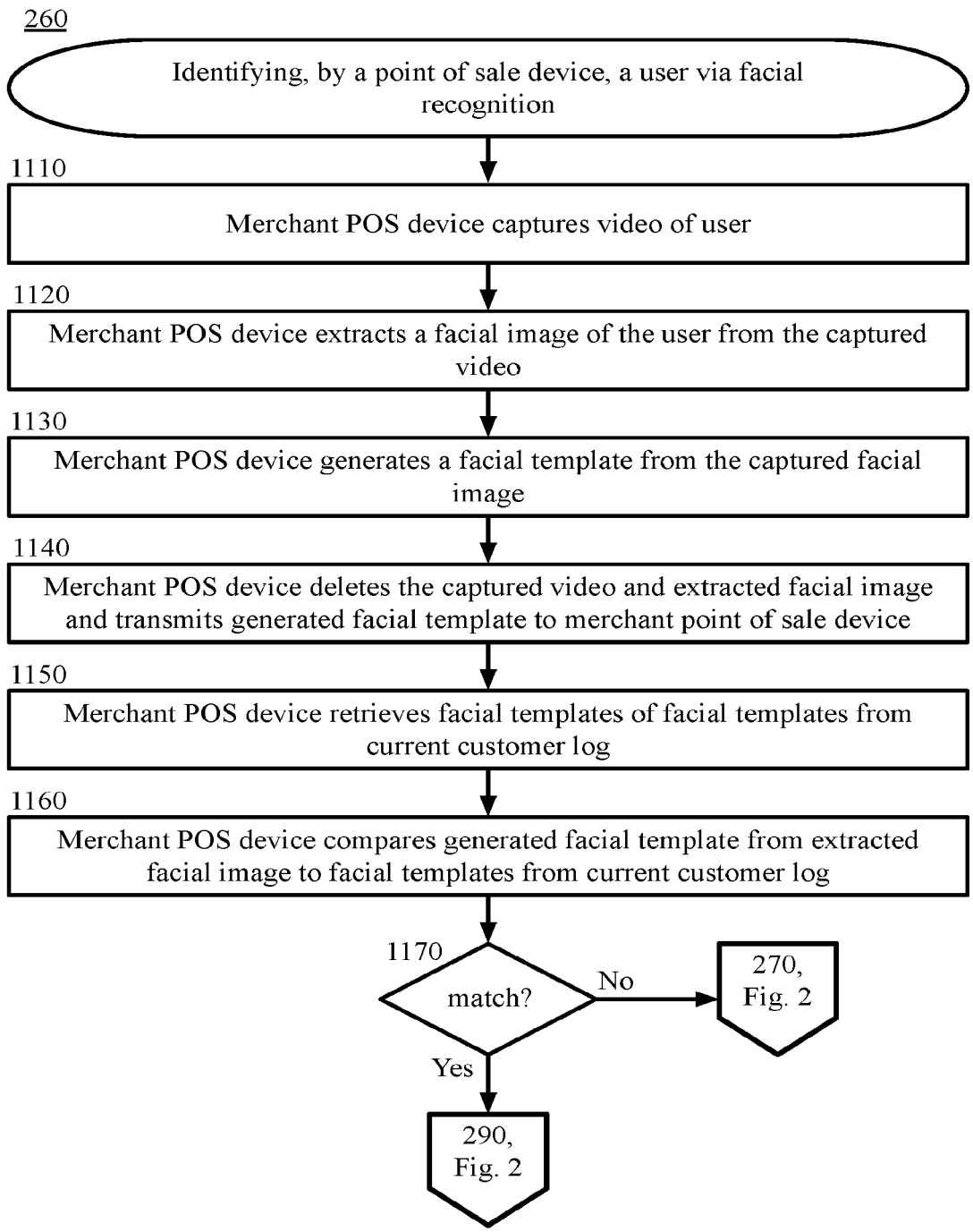
FIG. 11 is a block flow diagram depicting a method for identifying, by a merchant POS device, a user via facial recognition, in accordance with certain example embodiments.

FIG. 11 is a block diagram depicting a method 260 for identifying, by a merchant POS device 130, a user 101 via facial recognition, in accordance with certain example embodiments. The method 260 is described with reference to the components illustrated in FIG. 1.

In block 1110, the merchant POS device 130 captures video of the user 101. In an example embodiment, in response to receiving a request to identify the user 101, the merchant POS device 130 activates the camera 132 to begin to capture a video of the surroundings of the merchant POS device 130. In an example embodiment, the merchant POS device 130 captures a video feed of the user's 101 face. In another example embodiment, the camera 132 continuously captures, but does not record, a video feed of its surroundings. In this example embodiment, when the merchant POS device 130 receives an input from the merchant POS device 130 operator 102, a request to identify the user 101 is received from the account management system 160. The camera 132 begins to record the video feed for a threshold amount of time. In an example embodiment, the user 101 may be moving during the period in which the camera 132 records the video feed. In an example embodiment, the camera 132 extracts a facial image by determining a particular frame of the video feed and area of the instance of the video feed corresponding to the face of the user. In another example embodiment, the merchant POS device 130 captures one or more facial images of the user 101 via the camera 132.

In block 1120, the camera 132 extracts a facial image of the user 101 from the captured video. In an example embodiment, the camera 132 determines a frame of the captured video to provide an image of the user's 101 face and extracts the frame of the captured video.

In certain other example embodiments, the camera 132 determines a frame of the captured video to provide an image of the faces of a plurality of users 101. For example, the frame comprises an image of the face of a first user 101, a second user 101, and a third user 101 at different locations in the image. In this example, one camera 132 associated with a particular merchant POS device 130 captures video of an environment corresponding to an area in the proximity of multiple merchant POS devices 130. In this example embodiment, the camera 132 determines to which particular merchant POS device 130 each of the plurality of faces of the corresponding plurality of users 101 in the extracted image.

In block 1130, merchant POS device 130 generates a facial template from the captured facial image. In another example, the merchant POS device 130 generates the facial template. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example embodiment, the merchant POS device 130 stores the generated facial template in a data storage unit associated with the merchant POS device 130. For example, the merchant POS device 130 may comprise a log of facial templates of current customers.

In certain other example embodiments, the merchant POS device 130 continuously captures a video feed of its surroundings as users 101 enter and leave the vicinity of one or more merchant POS devices 130 over the course of a certain time period. In this example embodiment, the merchant POS device 130 and/or camera 132 is able to continuously monitor the incoming video feed to detect faces from extracted frames of the video feed. In this example embodiment, the camera 132, each time the camera 132 detects the presence of one or more faces in the video feed, the camera 132 extracts a frame of the video feed comprising one or more facial images of one or more corresponding detected faces and creates facial templates based on the extracted one or more facial images. In this example embodiment, the merchant POS device 130 stores facial templates in the log of facial templates of current customers as they are generated. In this example embodiment, as the camera 132 or the merchant POS device 130 generates subsequent facial templates. The merchant POS device 130 determines whether a generated subsequent facial template is similar to or within a predefined threshold to any of the facial templates already stored in the customer log. If the generated subsequent facial template is similar to or within a threshold to any of the facial templates already stored in the customer log, the merchant POS device 130 adds the facial template to the customer log and associates the facial template to one or two particular merchant POS devices 130 based on the position of the associated facial images in the extracted frame of the captured video. In an example embodiment, at the time that the merchant beacon device 120 and/or merchant POS devices 130 are installed at the merchant location, the account management system 160 associates the merchant beacon device 120 with one or more particular merchant POS devices 130. In this example embodiment, the account management system 160 comprises a database comprising a table that correlates the merchant beacon device 120 code associated with the merchant beacon device 120 with device identifiers associated with the one or more merchant POS devices 130 associated with the merchant beacon device 120. In an example embodiment, when the account management system 160 receives the merchant beacon device 120 code retransmitted form the user computing device 110, the account management system 160 determines the one or more POS devices 130 associated with the merchant beacon device 120 identified by the merchant beacon device 120 code by looking up the merchant beacon device 120 code in the table that associates merchant beacon device 120 codes with associated merchant POS device 130 identifiers. In an example embodiment, if the generated subsequent facial template is not similar to within a threshold to any facial templates already stored in the customer log, the merchant POS device 130 deletes, ignores, and/or does nothing with the generated facial template. In this example embodiment, if the merchant POS device 130 determines that a certain facial image is no longer in the field of the video feed, the corresponding facial template is deleted from the log of facial templates of current customers.

In block 1140, the merchant POS device 130 deletes the captured video and the extracted facial image. For example, the camera 132 does not store captured images or video. In this example, facial templates generated by the camera 132 comprise computer code representations of facial images of users 101. In this example, after generating a facial template or after a threshold time has passed after capturing video or images or extracting an image from a video, the merchant POS device 130 deletes any captured or extracted video or images.

In block 1150, the merchant POS device 130 retrieves facial templates from the customer log. For example, the customer log comprises facial templates received from the account management system 160 corresponding to all users 101 whose associated user computing devices 110 are located within a network distance of a merchant beacon device 120.

In block 1160, the merchant POS device 130 compares the generated facial template from captured facial image to facial templates from the customer log. In another example embodiment, the account management system 160 compares the generated facial template from captured facial image to facial templates from the customer log. Comparing the generated facial template generated from the captured facial image to facial templates from the customer log may comprise comparing one or more individual features or components of the templates. For example, the facial template may describe key features of the facial image of the user 101, such as shape, color, line, value, space, form, texture, or other useful or relevant feature of the image or of particular regions of the image.

In block 1170, the merchant POS device 130 determines whether there is a match between the generated facial template and one of the facial templates from the customer log. In an example, a match comprises a complete match between the generated facial template and a facial template from the current customer log. In another example, a match comprises a similarity greater than a predefined threshold similarity between the generated facial template and a facial template from the current customer log. For example, the merchant POS device 130 determines a similarity value for each of the one or more individual features or components between the generated facial template and the facial template from the customer log. In this example, the merchant POS device 130 may then determine an overall similarity value between the generated facial template and the facial template from the customer log and compare the overall similarity value against the predefined threshold similarity value. If the overall similarity value is greater than or equal to the predefined threshold similarity value, the merchant POS device 130 may determine that there is a match between the generated facial template and the facial template from the customer log. However, if the overall similarity value is less than the predefined threshold similarity value, the merchant POS device 130 may determine that there is no match between the generated facial template and the facial template from the customer log.

In certain other example embodiments, the account management system 160 compares the generated facial template against an existing facial template associated with the user 101 account. In an example embodiment, the account management system 160 receives a user 101 account identifier from the merchant POS device 130 that is associated with the user 101 account and identifies the user 101 account based on this user 101 account identifier. In this example embodiment, the account management system 160 extracts the existing facial template from the user 101 account associated with the received user 101 account identifier. In an example embodiment, the account management system 160 compares like features from the generated facial template against corresponding like features from the existing facial template associated with the user 101 account. For example, the account management system 160 may compare the key features of the generated facial template, such as shape, color, line, value, space, form, texture, or other useful or relevant feature of the image or of particular regions of the image against similar key features of the existing facial template associated with the user 101 account. In an example embodiment, for each key feature, the account management system 160 generates an individual delta value that describes a degree or proportion of difference between the generated facial template and the existing facial template. In this example embodiment, the account management system 160 generates an overall delta value or aggregated delta value based on each individual delta value. For example, the overall delta value or aggregated delta value gives an overall measure of the degree of difference between the generated facial template and the existing facial template. In this example, an individual delta value or overall (or aggregated) delta value may comprise a number between 0 and 1, with 1 meaning that the facial templates are completely alike and 0 meaning that the facial templates are completely unalike.

If a facial template from the customer log matches the generated facial template, the method 260 proceeds to block 290 in FIG. 2. For example, the merchant POS device 130 processes the transaction.

Returning to block 1170, if none of the facial templates from the customer log matches the generated facial template, the method 260 proceeds to block 270 in FIG. 2.

Returning to block 270, in FIG. 2, the merchant POS device 130 identifies the user 101 via voice recognition. In another example embodiment, the account management system 160 does not identify the user 101 via voice recognition and proceeds to identify the user 101 via challenge and response. For example, the merchant POS device 130 and/or account management system 160 is unable to identify the user via facial recognition and/or if the merchant POS device 130 and/or account management system 160 identify two or more users 101 via facial recognition. The method for identifying, by a merchant POS device 130, a user 101 via voice recognition is described in more detail hereinafter with reference to the method 270 described in FIG. 12. In another example embodiment, the account management system 160 identifies the user 101 via voice recognition. Accordingly, one or more functions herein described as being performed by the merchant POS device 130 may also be performed by the account management system 160.

Figure 12:
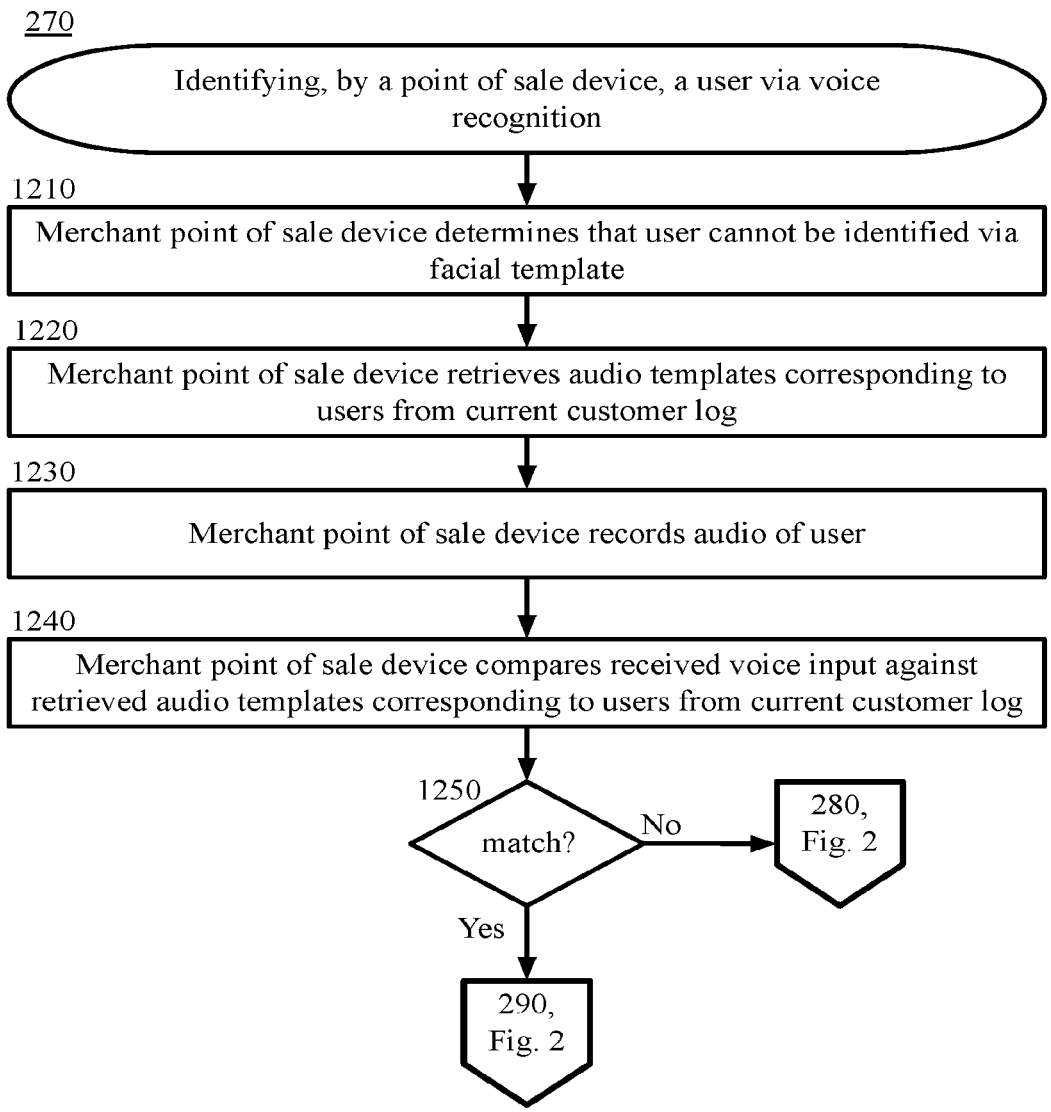
FIG. 12 is a block flow diagram depicting a method for identifying, by a merchant POS device, a user via voice recognition, in accordance with certain example embodiments.

FIG. 12 is a block diagram depicting a method 270 for identifying, by a merchant POS device 130, a user 101 via voice recognition, in accordance with certain example embodiments. The method 270 is described with reference to the components illustrated in FIG. 1.

In block 1210, the merchant POS device 130 determines that the user 101 cannot be identified via the facial template. In certain example embodiments, it may be necessary to identify a user 101 via voice recognition because the merchant POS device 130 is not able to identify the user 101 based on facial recognition. For example, the merchant camera 132 may be unable to extract an adequate facial image of the user 101 from the video feed to generate a facial template. In another example, the merchant POS device 130 is unable to find a match for the facial template of the user 101 in the customer log. In yet another example, the merchant POS device 130 identifies a matching user 101 facial template in the customer log, however, the identified user 101 facial template is assigned to two adjacent merchant POS devices 130. In this example, the user 101 may have to identify himself via voice recognition at the POS device 130 at which the user 101 initiates the transaction.

In block 1220, the merchant POS device 130 retrieves audio templates corresponding to users 101 from the customer log. As previously discussed, when a user 101 establishes an account with the account management system 160, the user 101 may submit an audio recording of the user's 101 voice to the merchant POS device 130. In this example the account management system 160 establishes an audio template corresponding to the user 101 based on the received audio recording. In another example embodiments, the user 101 does not submit an audio recording to the account management system 160 at the time the user 101 establishes the user 101 account. In this other example embodiment, the account management system 160 does not have an audio template associated with the user 101 account and cannot verify the user 101 via voice recognition.

In block 1230, the merchant POS device 130 records audio of the user 101. For example the merchant system POS device 130 displays the request for the user 101 to record audio. For example, the merchant system POS device 130 may display directions to the user 101 to record an audio recording. For example, the user 101 may be directed to speak the same words in the same intonation as the user 101 did when establishing the audio template with the account management system 160 at the time of setting up the user 101 account. In an example, the merchant system POS device 130 records a voice input of the user 101. For example, the merchant POS device operator 102 may actuate an object on the user interface 135 to activate an audio module 131 to receive an audio input of the user 101. In an example, the merchant POS device 130 or account management system 160 generates an audio template based on the received voice input. In an example, the audio template comprises a computer code representation of one or more features of the voice input.

In block 1240, the merchant POS device 130 compares the received voice input against the retrieved audio templates corresponding to users 101 from the customer log. In an example embodiment, the account management system 160 receives the voice input from the merchant POS device 130 and compares the received voice input against retrieved audio templates corresponding to users 101 from the customer log.

In block 1250, the merchant POS device 130 determines whether there is a match between the received voice input and one of the retrieved audio templates from the customer log. In an example embodiment, the merchant POS device 130 compares one or more features between the received voice input and each of the retrieved audio templates from the customer log. In an example embodiment, if the similarity between the received voice input and a particular audio template exceeds a predefined threshold, the merchant POS device 130 determines that the received voice input matches the particular audio template. In another example embodiment, if the similarity between the received voice input and the particular audio template is less than the predefined threshold, the merchant POS device 130 determines that the received voice input does not match the particular audio template. Comparing the generated audio template generated from the captured voice input to audio templates from the customer log may comprise comparing one or more individual features or components of the templates. For example, the facial template may describe key features of the voice input of the user 101, such as volume, pitch, or other useful or relevant feature of the audio template.

In an example, a match comprises a complete match between the generated audio template and a facial template from the current customer log. In another example, a match comprises a similarity greater than a predefined threshold similarity between the generated facial template and a facial template from the current customer log. For example, the merchant POS device 130 determines a similarity value for each of the one or more individual features or components between the generated audio template and the audio template from the customer log. In this example, the merchant POS device 130 may then determine an overall similarity value between the generated audio template and the audio template from the customer log and compare the overall similarity value against the predefined threshold similarity value. If the overall similarity value is greater than or equal to the predefined threshold similarity value, the merchant POS device 130 may determine that there is a match between the generated audio template and the audio template from the customer log. However, if the overall similarity value is less than the predefined threshold similarity value, the merchant POS device 130 may determine that there is no match between the generated audio template and the audio template from the customer log.

If an audio template from the customer log matches the received voice input, the method 270 proceeds to block 290 in FIG. 2. For example, the similarity between a particular audio template from the customer log and the received audio recording of the user 101 exceeds a predefined threshold and the merchant POS device 130 determines that there is a match.

Returning to block 1250, if none of the audio templates from the customer log match the received voice input, the method 270 proceeds to block 280 in FIG. 2. In another example embodiment, the merchant POS device 130 is unable to receive an audio recording of the user 101, the received audio recording of the user 101 is inadequate, or the received audio recording of the user 101 cannot be used to identify the user 101.

Returning to FIG. 2, in block 280, the user 101 is identified by the merchant system POS operator 102 via a challenge and a response. The method for identifying a user 101 via a challenge and a response is described in more detail hereinafter with reference to the method 280 described in FIG. 13.

Figure 13:
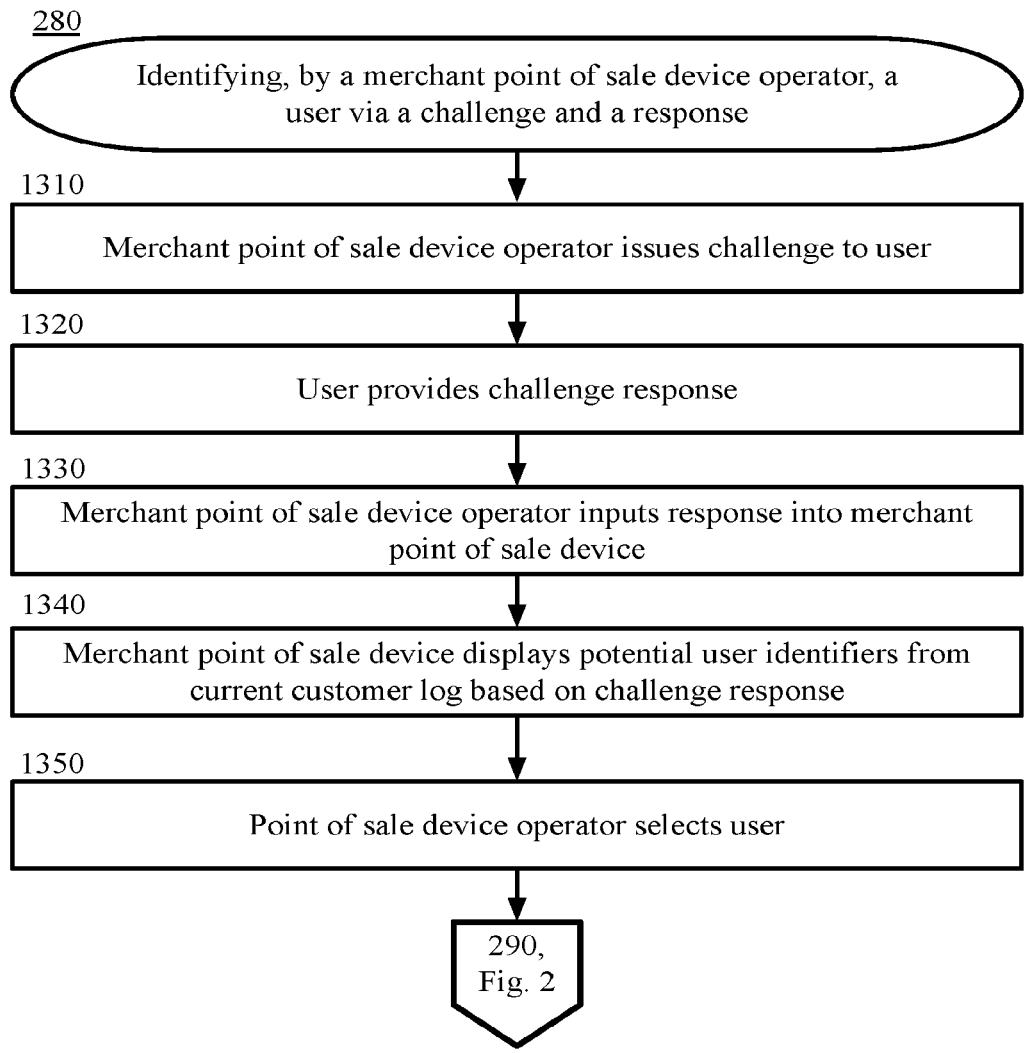
FIG. 13 is a block flow diagram depicting a method for identifying, by a merchant POS device operator, a user via a challenge and a response, in accordance with certain example embodiments.

FIG. 13 is a block diagram depicting a method 280 for identifying, by a merchant POS device operator 102, a user 101 via a challenge and a response, in accordance with certain example embodiments. The method 280 is described with reference to the components illustrated in FIG. 1.

In block 1310, the POS device operator 102 issues a challenge to the user 101. In an example, the merchant POS device operator 102 asks the user 101 for the initials of the user 101. In another example, the merchant POS device operator 102 asks the user 101 for the last four digits of the phone number of the user 101. In another example, the merchant POS device operator 102 asks the user 101 for a configured password. Any suitable challenge may be issued by the merchant POS device operator 102. In an example embodiment, the response to the challenge does not provide any secure or private information.

In block 1320, the user 101 provides a challenge response. As described in the previous example, the responses may be the initials of the user 101, the last four digits of the phone number of the user 101, or a configured password. Any configured challenge response may be utilized. In certain embodiments, the response may be a spoken response, a hand gesture, a keypad entry, a display of an identification card, or any suitable response.

In block 1330, the POS device operator 102 inputs the response into the merchant POS device 130. In an example, if the user 101 indicates that the initials of the user 101 are "AC," then the merchant POS device operator 102 inputs "AC" into the application 133 of the merchant POS device 130. In an example, the user interface 135 of the merchant POS device 130 displays a request for an entry of the response of the user 101. The merchant POS device operator 102 enters the response via a virtual or physical keyboard, voice dictation, or in any suitable manner. In an alternate example, the user 101 enters the response into the user interface 135 of the merchant POS device 130.

In block 1340, the merchant POS device 130 displays potential users 101 based on the challenge response. The merchant POS device 130 displays potential users 101 based on the challenge response. A list of users 101 that are associated with the challenge response are displayed on the merchant POS device 130 to the merchant POS device operator 102. For example, if ten customers are in the vicinity of the merchant beacon device 120, then the merchant POS device 130 may have received from the account management system 160 a challenge response associated with each of the respective ten customers. When the merchant POS device 130 receives the challenge response input, only the potential users 101 that are associated with the challenge response are displayed to the merchant POS device operator 102.

In the example, if the merchant POS device operator 102 inputs "AC" as the initials of the user 101 associated with the transaction, then only the potential users 101 with those initials will be displayed to the merchant POS device operator 102 by the application 133. The application 133 accesses a database on the account management system 160 or another computing device and identifies the initials of the potential users 101 that have provided tokens. The application 133 identifies the one or more potential users 101 that have the initials "AC" and displays the identified user 101 accounts to the merchant POS device operator 102. In the example, two of the ten customers that are in the vicinity of the merchant beacon device 120 have the initials "AC." The user 101 accounts of the two customers are displayed to the merchant POS device operator 102.

In certain example embodiments, all of the nearby customers who have had tokens transmitted to the merchant POS device 130 are presented to the merchant POS device operator 102 and the merchant POS device operator 102 selects the appropriate user 101 account.

In another embodiment, the merchant POS device 130 or the account management system 160 presents additional challenges until there is a single matching user 101 remaining.

The application 133 may display a picture of the potential user 101 accounts that are presented to the merchant POS device operator 102. For example, each user 101 may associate a picture with a user 101 account. When the merchant POS device 130 presents the one or more potential user 101 accounts to the merchant POS device operator 102, the merchant POS device operator 102 may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented.

In block 1350, the merchant POS device operator 102 selects the user 101 account for use in a transaction. After identifying the displayed picture of the user 101, the merchant POS device operator 102 may input a selection of the user 101 by actuating a user interface 135 control associated with the picture, or by inputting the selection in any suitable manner. If the picture doesn't match any of the potential users, then the merchant POS device operator 102 may cancel the transaction, notify the user 101 of the discrepancy, or perform any other suitable action.

In an example, only a single user 101 account is presented in the list of potential users 101. If only a single user 101 account is identified, then the method may proceed after the merchant POS device operator 102 verifies that the displayed picture matches the user 101. If the picture doesn't match, then the merchant POS device operator 102 may cancel the transaction, notify the user 101 of the discrepancy, or perform any other suitable action.

From block 1350, the method 280 proceeds to block 290 in FIG. 2.

Returning to FIG. 2, in block 290, a transaction is processed. The method for processing a transaction is described in more detail hereinafter with reference to the method 290 described in FIG. 14.

Figure 14:
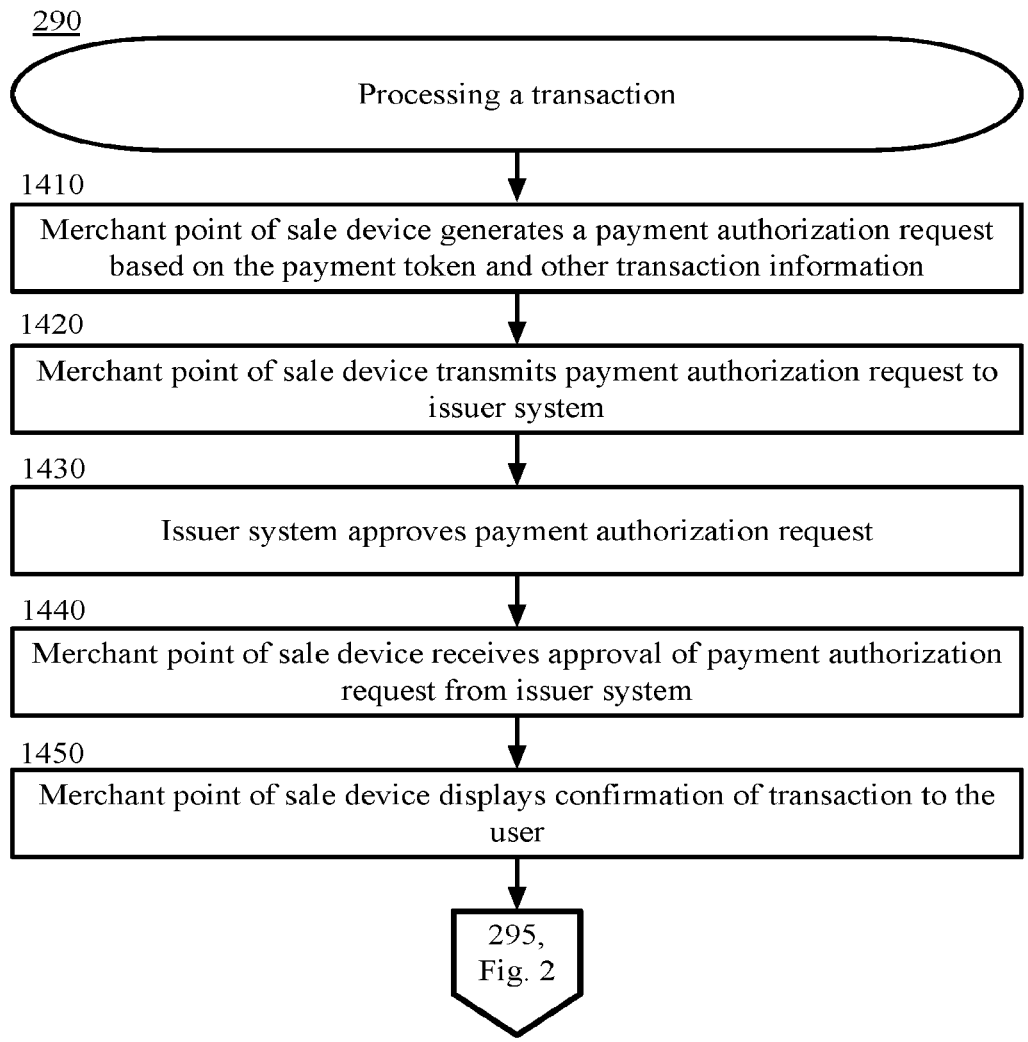
FIG. 14 is a block flow diagram depicting a method for conducting a transaction, in accordance with certain example embodiments.

FIG. 14 is a block diagram depicting a method 290 for processing a transaction, in accordance with certain example embodiments. The method 290 is described with reference to the components illustrated in FIG. 1.

In block 1410, the merchant POS device 130 generates a payment authorization request based on the payment token and other transaction information. In an example embodiment, the payment authorization request comprises the payment token received from the account management system 160 for the user 101 along with transaction details. Example transaction details comprise a transaction total, a description of one or more items being purchased, a merchant identifier, a merchant payment account identifier, and/or other relevant transaction details.

In block 1420, the merchant POS device 130 transmits the payment authorization request to the issuer system 150. For example, the merchant POS device 130 communicates the payment authorization request to the issuer system 150 via the network 140.

In block 1430, the issuer system 150 approves the payment authorization request. In an example embodiment, the issuer system 150 identifies the user payment account based on the received payment token. For example, the issuer system 150 accesses a database that associates payment tokens with user 101 payment account identifiers. In an example, the database further associates payment tokens with one or more conditions, such as a length of time for which the payment token is valid. For example, a payment token may only be valid for a threshold length of time, for example one hour, after it is generated by the account management system 130. In this example, as part of the transaction details in the payment authorization request, a current timestamp is received from the merchant POS device 130. The issuer system 150 compares the timestamp to the one or more time conditions described in the database and associated with the payment token or associated with other data received from the account management system 160.

In another example, the payment token is valid only for use at a particular merchant system. In this example, the transaction details received with the payment authorization request from the merchant POS device 130 comprise a merchant system identifier. In this example, the issuer system 150 determines that the payment token is valid if the merchant identifier received in the transaction details matches the merchant identifier identified in the one or more conditions associated with the payment token in the database.

In certain other example embodiments, other conditions related to time, location, merchant identifier, or a combination of these conditions and/or other conditions may be specified in the database as associated with one or more particular payment tokens. In an example embodiment, the issuer system 150 verifies that a payment token received as part of a payment authorization request is valid based at least in part on data received from the merchant POS device 130 and/or data currently available to the issuer system 150. In an example embodiment, to process the transaction, the issuer system 150 identifies the user payment account associated with the received payment token in the database and processes the transaction using the transaction details and the identified user payment account information.

In block 1440, the merchant POS device 130 receives an approval of the payment authorization request from the issuer system 150. In an example embodiment, the issuer system 150 either approves or declines the payment authorization request. In this example embodiment, the issuer system 150 may base the decision of whether to approve or decline the payment authorization request based on a total amount of transaction the current available credit of the user 101 for the user 101 payment account. In an example embodiment, the merchant POS device 130 receives, via the network 140, the approval of the payment authorization request from the issuer system 150 if the issuer system 150 approves the payment authorization request. In another example embodiment, the merchant POS device 130 receives a notice of declined payment authorization request from the issuer system 150 via the network 140 if the issuer system 150 declines the payment authorization request.

In block 1450, the merchant POS device 130 displays a confirmation of the approved transaction to the user 101. An example confirmation of the approved transaction comprises a total amount charged to the user 101 payment account, an identification of the user 101 payment account, a merchant system name, and/or other relevant or useful information. In another example embodiment, the merchant POS device 130 displays a notification of a declined transaction in response to receiving a notice of declined payment authorization request from the issuer system 150. For example, the merchant POS device 130 displays a message reading "This transaction has been declined" to the user via the user interface 135 of the merchant POS device 130. In another example embodiment, the merchant POS device 130 prints a receipt for the user 101.

In certain example embodiments, from block 1450, the method 290 proceeds to block 295 in FIG. 2. In certain other example embodiments, the method 290 may end at block 1450. In certain example embodiments, the user 101 does not process a transaction.

Returning to FIG. 2, in block 295, a user 101 updates user 101 account data associated with an account of the user 101. For example, at a time after initially configuring user account data, the user 101 associated with the user 101 account may wish to update the user's 101 account data. Example account data comprises one or more of payment account data, user 101 contact information, user 101 demographic data, user 101 permission settings for hands-free transactions, the facial template, the audio template, the challenge and response, and/or any other user 101 account data associated with the user 101 account. In an example embodiment, updating user 101 account data may comprise adding, deleting, editing, rearranging, or other appropriate action with respect to user 101 account data. For example, the user 101 may desire to add new payment account information associated with a credit account or bank account of the user 101. In another example, the user 101 may desire to update the facial template, audio template and/or challenge and response at a time before an initial hands-free transaction or at a time after the initial hands-free transaction and before a subsequent hands-free transaction.

The method for updating user 101 account data at a merchant POS device 130 via a password comprising a facial template is described in more detail hereinafter with reference to the method 295 described in FIG. 15.

Figure 15:
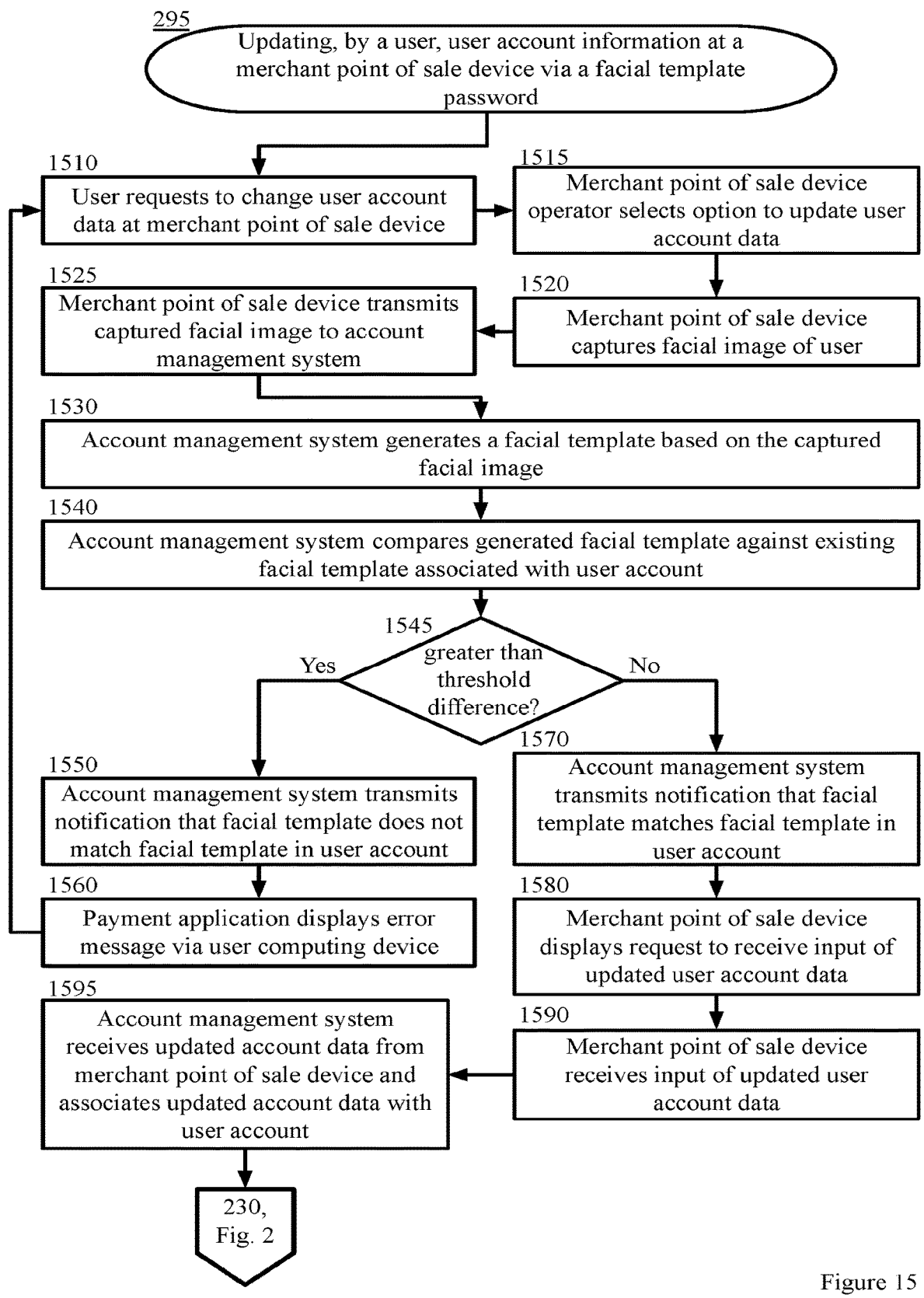
FIG. 15 is a block flow diagram depicting a method for updating, by a user, user account information at a merchant POS device via a facial template password, in accordance with certain example embodiments.

FIG. 15 is a block diagram depicting a method 295 for updating user 101 account data at a merchant POS device 130 via a password comprising a facial template, in accordance with certain example embodiments. The method 295 is described with reference to the components illustrated in FIG. 1. In another example embodiment described herein, the user 101 may request to update user 101 account data via the user computing device 110 or other computing device using a password comprising a facial template of the user 101. In another example embodiment, the user 101 may request to update user 101 account data via the user computing device 110 or other computing device using a password comprising an audio template. Accordingly, one or more of the functions described as being performed by the merchant POS device 130 with respect to the method for updating user 101 account data may be performed by the user computing device 110.

In block 1510, the user 101 requests to change user 101 account data at the merchant POS device 130. In an example embodiment, the user 101 has completed a hands-free transaction at the merchant location and now desires to update user 101 account data. In another example embodiment, the user 101 has not initiated a transaction at the merchant location and desires to update user 101 account information. In yet another example embodiment, the user 101 is in the process of a transaction at the merchant location and desires to update user 101 account information. For example, the user 101 has been identified and the merchant POS device 130 has received the user 101 account information comprising payment account information. In this example, the user 101 may not be satisfied with his payment account options or may otherwise desire to update his user 101 account information at that point. In certain example embodiments, the user 101 provides a user 101 account number associated with the user 101 account to the merchant POS device 130 operator to input to the merchant POS device 130, taps the user computing device 110 to a reader of the merchant POS device 130 to provide account information comprising a user 101 account identifier, or otherwise provides a user 101 account identifier to the merchant POS device 130.

In block 1515, the merchant POS device 130 operator 102 selects an option to update user 101 account data. In an example embodiment, the merchant POS device 130 operator 102 selects an option to update user 101 account data as directed by the user 101. In another example embodiment, the user 101 selects the option to update the user 101 account data. In an example embodiment, selecting an option to update user 101 account data comprises actuating one or more objects on the user interface of the merchant POS device 130. For example, the merchant POS device 130 displays, via the user interface, a user interface object that reads "update user account information."

In block 1520, the merchant POS device 130 captures a facial image of the user 101. In an example embodiment, the merchant POS device 130 captures the facial image of the user 101 in response to receiving an input of a selection of a user interface object requesting the merchant POS device 130 to update user 101 account information. In this example embodiment, in response to the user actuating the object on the user interface 115, the camera 132 receives a command from the application 133 to capture an image of the user 101. In another example embodiment, the camera 132 receives a command from the application 133 to capture a plurality of images of the user 101. For example, each of the plurality of images of the user 101 may correspond to a particular pose of the user's 101 face. An example facial image may comprise a digital image of the face of a user 101. In an example embodiment, the account management system 160 may establish guidelines for users 101 in submitting facial images. For example, the user 101 may be required to remove any hats, head coverings, glasses, or other objects or accessories that may occlude regions of the user's 101 face so that application 133 may receive a complete depiction of the user's 101 face. In an example embodiment, instead of directly capturing the user 101 facial image, the merchant POS device 130 may be communicatively coupled via a network 140 to a merchant camera device, which captures the image of the user 101. In certain example embodiments, the merchant POS device 130 operator or user 101 must actuate one or more objects on the user interface of the merchant POS device 130 to direct the merchant POS device 130 or camera device to capture the facial image of the user 101.

In block 1530, the merchant POS device 130 transmits the captured facial image to the account management system 160. In an example embodiment, the merchant POS device 130 transmits the captured facial image to the account management system 160 via the network 140. In another example embodiment, the merchant camera device transmits the captured image to the account management system 160 via the network 140 or otherwise communicates the captured image to the merchant POS device, wherein the merchant POS device 130 transmits the captured image to the account management system 160 via the network 140. In an example embodiment, the merchant POS device 130 transmits the captured facial image to the account management system 160 along with the user 101 account identifier and a request to update user 101 account information to the account management system 160 via the network 140. In another example embodiment, the merchant POS device 130 already captured a facial image of the user 101 in a recent transaction and does not capture a subsequent facial image of the user 101 but transmits to the account management system 160 the previously captured facial image of the user 101 associated with the recent transaction.

In certain example embodiments, the merchant POS device 130 or merchant camera device determines if the captured facial image is a valid facial image or an invalid facial image. For example, a valid facial image complies with guidelines predetermined by the account management system 160 and an invalid facial image does not comply with one or more of the guidelines. For example, if the merchant POS device 130 or merchant camera device captures a facial image that comprises incorrect dimensions, if part or all of the user's 101 face is occluded, or if the image is too dark or too bright, the merchant POS device 130 or merchant camera device rejects the invalid facial image and displays a request directing the user 101 to capture a subsequent facial image. In another example, the captured facial image that is not of a face and the application 133 or camera device determines, via facial recognition, that the image is not of a face and directs the camera of the merchant POS device 130 or merchant camera device to capture a subsequent facial image of the user 101 to transmit to the account management system 160. In this example, the merchant POS device 130 or merchant camera device captures a subsequent facial image via the user computing device 110. In another example, the account management system 160 determines if the captured facial image is a valid facial image or an invalid facial image. Accordingly one or more functions described herein as being performed by the merchant POS device 130 may also be performed by the account management system 160.

In block 1535, the account management system 160 generates a facial template based on the captured facial image. In an example embodiment, the account management system 160 creates a facial template associated with the user 101 account based on the received facial image. In another example embodiment, the account management system 160 generates a corresponding facial template for each of a plurality of received facial images associated with the user 101 account. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network.

In another example embodiment, after the merchant POS device 130 or merchant camera device captures one or more facial images of the user 101, the respective merchant POS device 130 or merchant camera device generates one or more facial templates corresponding to one or more of the one or more captured facial images of the user 101. In this example embodiment, the merchant POS device 130 or merchant camera device transmits the one or more generated facial templates to the account management system 160 over the network 140. In an example embodiment, the account management system 160 deletes the received facial image. For example, the account management system 160 only uses a facial template comprising a computer code representation of the facial image of the user 101. For example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network.

In block 1540, the account management system 160 compares the generated facial template against an existing facial template associated with the user 101 account. In an example embodiment, the account management system 160 receives a user 101 account identifier from the merchant POS device 130 that is associated with the user 101 account and identifies the user 101 account based on this user 101 account identifier. In this example embodiment, the account management system 160 extracts the existing facial template from the user 101 account associated with the received user 101 account identifier. In an example embodiment, the account management system 160 compares like features from the generated facial template against corresponding like features from the existing facial template associated with the user 101 account. For example, the account management system 160 may compare the key features of the generated facial template, such as shape, color, line, value, space, form, texture, or other useful or relevant feature of the image or of particular regions of the image against similar key features of the existing facial template associated with the user 101 account. In an example embodiment, for each key feature, the account management system 160 generates an individual delta value that describes a degree or proportion of difference between the generated facial template and the existing facial template. In this example embodiment, the account management system 160 generates an overall delta value or aggregated delta value based on each individual delta value. For example, the overall delta value or aggregated delta value gives an overall measure of the degree of difference between the generated facial template and the existing facial template. In this example, an individual delta value or overall (or aggregated) delta value may comprise a number between 0 and 1, with 1 meaning that the facial templates are completely alike and 0 meaning that the facial templates are completely unalike.

In block 1545, the account management system 160 determines whether the difference between the generated facial template and the existing facial template associated with the user 101 account is greater than a threshold amount. In another example embodiment, the account management system 160 determines whether the difference between the generated audio template and the existing audio template associated with the user 101 account is greater than a threshold amount. In an example embodiment, predefining a higher threshold delta amount results in more security fore users 101 because it makes it more difficult for an illegitimate user 101 to attempt to access, replace and/or edit user account data. However, predefining a higher threshold delta amount for comparing existing facial or audio templates against generated facial or audio templates may result in inconvenience for the user 101 when the user 101 desires to update user account data. For example, a user 101 capturing an image in poor lighting conditions or capturing a sound recording with background noise interference may result in an overall or aggregated delta value that does not exceed the predefined threshold even though individual delta values for other applicable key features may exceed a required threshold for individual feature-specific delta values. In this example embodiment, predefining a lower threshold delta amount results in less security for users 101 because it makes it more difficult for an illegitimate user 101 to attempt to access and/or edit user 101 account data. However, predefining a lower threshold delta amount for comparing existing facial or audio templates against generated facial or audio templates also may result in more convenience for users 101.

If the account management system 160 determines that the difference between the generated facial template and existing facial template associated with the user 101 account or existing audio template associated with the user 101 account is greater than a threshold difference, the method 295 proceeds to block 1550. For example, the predefined overall or aggregated threshold delta value for comparing the difference of a generated facial template against an existing facial template currently associated with a user 101 account is 0.1 and the determined overall or aggregated delta value based on the account management system 160 comparing the generated facial image against the existing facial template associated with the user 101 account is 0.12. In certain other example embodiments, instead of determining a overall delta value that is greater than a predetermined threshold delta value representing a degree of difference between the generated facial or audio template and the existing facial or audio template, the account management system 160 determines an overall delta value that is less than a predetermined threshold delta value representing a degree of likeness between the generated facial or audio template and the existing facial or audio template.

In block 1550, the account management system 160 transmits a notification to the merchant POS device 130 that the generated facial template does not match the facial template associated with the user 101 account. In another example embodiment, the account management system 160 transmits a notification to the user computing device 110 that the user 101 may not update user 101 account data. For example, in response to determining an overall delta value that is greater than a predetermined threshold delta value representing a degree of difference or an overall delta value that is less than a predetermined threshold delta value representing a degree of likeness between the generated facial or audio template and the existing facial or audio template, the account management system 160 transmits the notification to the user computing device 110 that the facial template does not match the facial template associated with the user 101 account and/or that the user 101 may not update user 101 account data.

In block 1560, the application 113 displays an error message via the user computing device 110. For example, the application 113 displays, via the user interface 115 of the user computing device 110, a message that reads "User account facial template verification attempt unsuccessful. User may not update account data at this time. Please try again later."

From block 1560, the method 295 returns to block 1510, and the user 101 attempts a second or subsequent time to update the user 101 account data. In an example embodiment, if the user 101 (or an illegitimate user) unsuccessfully attempts to update the user 101 account data more than a predetermined number of times, the account management system 160 may otherwise alert the user 101. In other example embodiments, if the user 101 (or an illegitimate user) unsuccessfully attempts to update the user 101 account data more than a predetermined number of times, the account management system 160 may disable or deactivate the user account so that the user 101 account may not be accessed or used in any transactions until the user 101 contacts the account management system 160.

Returning to block 1545, in FIG. 15, if the account management system 160 determines that the difference between the generated facial template and existing facial template associated with the user 101 account is less than or equal to a threshold difference, the method 295 proceeds to block 1570. For example, the predefined overall or aggregated threshold delta value for comparing the difference of a generated facial template against an existing facial template currently associated with a user 101 account is 0.1 and the determined overall or aggregated delta value based on the account management system 160 comparing the generated facial image against the existing facial template associated with the user 101 account is 0.05. In certain other example embodiments, instead of determining a overall delta value that is less than or equal to than a predetermined threshold delta value representing a degree of difference between the generated facial or audio template and the existing facial or audio template, the account management system 160 determines an overall delta value that is greater than or equal to a predetermined threshold delta value representing a degree of likeness between the generated facial or audio template and the existing facial or audio template.

In block 1570, the account management system 160 transmits a notification to the merchant POS device 130 that the generated facial template matches the facial template associated with the user 101 account. For example, the account management system 160 transmits the notification that the generated facial template matches the facial template associated with the user 101 account to the merchant POS device 130 via the network 140. In another example embodiment, the account management system 160 transmits a notification, via the network 140, to the merchant POS device 130 that the user 101 may update user 101 account data. In yet another example embodiment, the account management system 160 transmits a notification, via the network 140, to the merchant POS device 130 indicating both that the user 101 may update user 101 account data and that the generated facial template matches the facial template associated with the user 101 account.

In block 1580, the merchant POS device 130 displays a request to receive an input of updated user 101 account data. In an example embodiment, the merchant POS device 130 may display, via the user interface of the merchant POS device 130, that the image verification process was successful and requesting that the user 101 provide updated user 101 account data. For example, the merchant POS device 130 displays, to the user 101 and/or the merchant POS device 130 operator, a request that states "user 101 image verification successful; please input updated user 101 account information."

In block 1590, the merchant POS device 130 receives an input of updated user 101 account data. In an example embodiment, the user interface displayed by the merchant POS device 130 comprises one or more fields wherein the user 101 and/or the merchant POS device 130 operator may provide one or more inputs comprising updated user 101 account data. For example, the user 101 inputs the updated user 101 account data directly via the merchant POS device 130 and/or the merchant POS device 130 operator inputs the updated user 101 account data to the merchant POS device 130 on behalf of the user 101 and at the direction of the user 101. For example, via the user interface display of the merchant POS device 130, the user 101 and/or the merchant POS device operator may add, delete, edit, or rearrange one or more data associated with the user 101 account. In an example, the merchant POS device operator or the user 101 may actuate a user interface object on the merchant POS device to cause the merchant POS device 130 to submit, via the network 140, the updated user 101 account data to the account management system 160.

In block 1595, account management system 160 receives the updated user 101 account data from the merchant POS device 130 and associates the updated user 101 account data with the user 101 account. For example, merchant POS device 130 transmits the updated user 101 account data to the account management system via the network 140 in response to receiving an input from the user 101 or the merchant POS device 130 operator and the account management system 160 receives the updated user 101 account data from the merchant POS device 160 via the network 140. In an example embodiment, associating the updated user 101 account data with the user 101 account comprises deleting all existing user 101 account data and replacing it with the received updated user 101 account data. In another example embodiment, associating the updated user 101 account data with the user 101 account comprises comparing the received updated user 101 account data with existing user 101 account data and overwriting any existing user 101 account data that does not match the received user 101 account data so that the existing user account 101 data is edited to match the received user 101 account data. In an example, the account management system 160 may limit an update of user 101 account information to individual fields or categories of user 101 account information or may update all user 101 account information.

In certain example embodiments, from block 1595, the method 295 returns to block 230 in FIG. 2. For example, the user 101 may now engage in transactions according to the methods described herein using the updated user 101 account data.

Other Example Embodiments

FIG. 16 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to update user account information using image verification, comprising, by one or more computing devices:

receiving, from a user computing device, an account identifier corresponding to a user account associated with a user associated with the user computing device and a beacon device identifier received by the user computing device via a network front a beacon device;

retrieving a stored facial template associated with the user account from a plurality of stored facial templates for a plurality of users;

adding the retrieved facial template to a log of one or more facial templates corresponding to a plurality of user computing devices from which the beacon device identifier has been previously received, the log including less than all of the plurality of stored facial templates for the plurality of users;

transmitting, to a service computing device, the log comprising the retrieved facial template, the service computing device identifying the user account by determining that a value of similarity between an image template generated from a captured image of the user and the transmitted facial template is greater than a predetermined value of similarity, wherein the service computing device determines the value of similarity by comparing, to the captured image, the one or more facial templates in the log corresponding to the previously received beacon identifier, the one or more facial templates being advantageously less than a count of the plurality of stored facial templates;

receiving, from the service computing device, updated account data and an update request in response to the service computing device determining that the value of similarity is greater than the predetermined value; and replacing, in the user account, one or more items of existing account data with the received updated account data in response to receiving the updated account data and the update request when the value is greater than the predetermined value.

2. The computer-implemented method of claim 1, wherein the service computing device captures the captured image via a camera device.

3. The computer-implemented method of claim 1, wherein the user computing device captures the captured image.

4. The computer-implemented method of claim 1, wherein the captured image comprises an image of the user.

5. The computer-implemented method of claim 4, wherein the image of the user comprises an image of a face of the user.

6. The computer-implemented method of claim 1, wherein the updated account data comprises one or more of updated user contact information, updated user demographic information, updated user payment account information, and an updated image template.

7. The computer-implemented method of claim 1, wherein the updated account data comprises additions, deletions, or edits to the existing account data.

8. The computer-implemented method of claim 1, wherein the generated image template comprises a computer code representation of the captured image.

9. The computer-implemented method of claim 1, wherein the comparing comprises, by the service computing device: determining a similarity value for one or more regions of the generated template and one or more regions of the transmitted facial template for each of one or more key features, each similarity value describing a particular similarity value between the image template generated based on the captured image and the transmitted facial template for the each of the one or more key features; and determining the determined value of similarity between the image template generated based on the captured image and the transmitted facial template based on each particular similarity value determined for each of the one or more key features.

10. The computer-implemented method of claim 9, wherein the one or more key features comprise one or more of shape, color, line, value, space, form, and texture.

11. A system to enable updates to user account information in response to facial image verification of users located at service system locations, comprising:

a storage device; and a processor communicatively coupled to the storage device, wherein the processor executes application code instructions that are stored in the storage device to cause the system to:

receive, from a user computing device, an account identifier corresponding to a user account associated with a user associated with the user computing device and a beacon device identifier received by the user computing device via a wireless network;

retrieve, from the user account, a stored facial template associated with the user account from a plurality of stored facial templates for a plurality of users;

add the retrieved facial template to a log of one or more facial templates corresponding to a plurality of user computing devices from which the beacon device identifier has been previously received, the log including less than all of the plurality of stored facial templates for the plurality of users;

transmit, to a service computing device, the log comprising the retrieved image template, the service computing device identifying the user account by determining that a determined value of similarity between an image template generated based on a captured image of the user and the transmitted facial template is greater than a predetermined value of similarity, wherein the service computing device determines the value of similarity by comparing, to the captured image, the one or more facial templates in the log corresponding to the previously received beacon identifier, the one or more facial templates being advantageously less than a count of the plurality of stored facial templates;

receive, from the service computing device, updated account data and an update request in response to the service computing device determining that the value of similarity is greater than the predetermined value; and replace, in the user account, one or more items of existing account data with the received updated account data in response to receiving the updated account data and the update request when the value is greater than the predetermined value.

12. The system of claim 11, wherein the image template comprises a computer code representation of the captured image.

13. The system of claim 11, wherein the updated account data comprises one or more of additions, deletions, or edits to the existing account data.

14. The system of claim 11, wherein the comparing comprises:

determining, by the service computing device, a similarity value for one or more regions of the generated template and one or more regions of the transmitted facial template for each of one or more key features, each similarity value describing a particular similarity value between the image template generated based on the captured image and the transmitted facial template for the each of the one or more key features; and determining, by the service computing device, the determined value of similarity between the image template generated based on the captured image and the transmitted facial template based on each particular similarity value determined for each of the one or more key features.

15. The system of claim 14, wherein the one or more key features comprise one or more of shape, color, line, value, space, form, and texture.

16. The system of claim 11, wherein the service computing device captures the captured image via a camera.

17. The system of claim 11, wherein the user computing device captures the captured image via a camera.

18. The system of claim 11, wherein the captured image comprises an image of the user.

19. The system of claim 11, wherein the image of the user comprises an image of a face of the user.

20. The system of claim 11, wherein the updated account data comprises one or more of updated user contact information, updated user demographic information, updated user payment account information, and an updated image template.

* * * * *